US012720336B2

(12) United States Patent
Kim et al.

(10) Patent No.: US 12,720,336 B2
(45) Date of Patent: Aug. 25, 2026

(54) METHOD AND APPARATUS FOR RECONFIGURATION FUNCTIONAL SPLIT OPTION OF DIGITAL UNIT AND RADIO UNIT IN WIRELESS COMMUNICATION SYSTEMS

(71) Applicant: SAMSUNG ELECTRONICS CO., LTD., Suwon-si (KR)

(72) Inventors: Sunhyun Kim, Suwon-si (KR); Dongmyung Kim, Suwon-si (KR); Deokhui Lee, Suwon-si (KR); Sangho Lee, Suwon-si (KR); Jinho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/680,933

(22) Filed: May 31, 2024

(65) Prior Publication Data

US 2024/0406758 A1 Dec. 5, 2024

(30) Foreign Application Priority Data

May 31, 2023 (KR) ........................ 10-2023-0069895

(51) Int. Cl.
*H04W 24/02* (2009.01)
*H04L 41/16* (2022.01)

(52) U.S. Cl.
CPC ............. *H04W 24/02* (2013.01); *H04L 41/16* (2013.01)

(58) Field of Classification Search
CPC ..... H04W 24/02; H04L 41/16; H04L 41/0823
See application file for complete search history.

(56) References Cited

U.S. PATENT DOCUMENTS 10,855,420 B2 12/2020 Park et al.
10,886,976 B2 1/2021 Rajagopal et al.
(Continued)

FOREIGN PATENT DOCUMENTS

KR 10-2018-0092638 A 8/2018
WO 2022133866 A1 6/2022
(Continued)

OTHER PUBLICATIONS

International Search Report and Written Opinion of the International Searching Authority dated Sep. 4, 2024, in connection with International Application No. PCT/KR2024/007461, 9 pages.

*Primary Examiner* — Hashim S Bhatti

(57) ABSTRACT

The present disclosure relates to a 5G communication system or a 6G communication system for supporting higher data rates beyond a 4G communication system such as long term evolution (LTE). The disclosure relates to a method performed by an radio unit (RU) of a base station in a wireless communication system, particularly, the disclosure may provide a method performed by an RU of a base station in a wireless communication system, comprising preparing for a functional split reconfiguration, receiving a functional split reconfiguration message from a digital unit (DU) of the base station, and reconfiguring a functional split option so that an artificial intelligence (AI) function of the RU is moved to the DU based on split option reconfiguration information included in the functional split reconfiguration message.

20 Claims, 28 Drawing Sheets

(56) References Cited

U.S. PATENT DOCUMENTS

2022/0167236 A1 5/2022 Melodia et al.
2022/0225199 A1 7/2022 Futaki et al.
2022/0232423 A1 7/2022 Thyagaturu et al.
2022/0278717 A1 9/2022 Tsui et al.
2022/0417948 A1 12/2022 Balasingam et al.
2024/0022927 A1* 1/2024 Tong ........................ H04W 4/40

FOREIGN PATENT DOCUMENTS

WO 2022205023 A1 10/2022
WO 2023070055 A1 4/2023

* cited by examiner

FIG. 9B

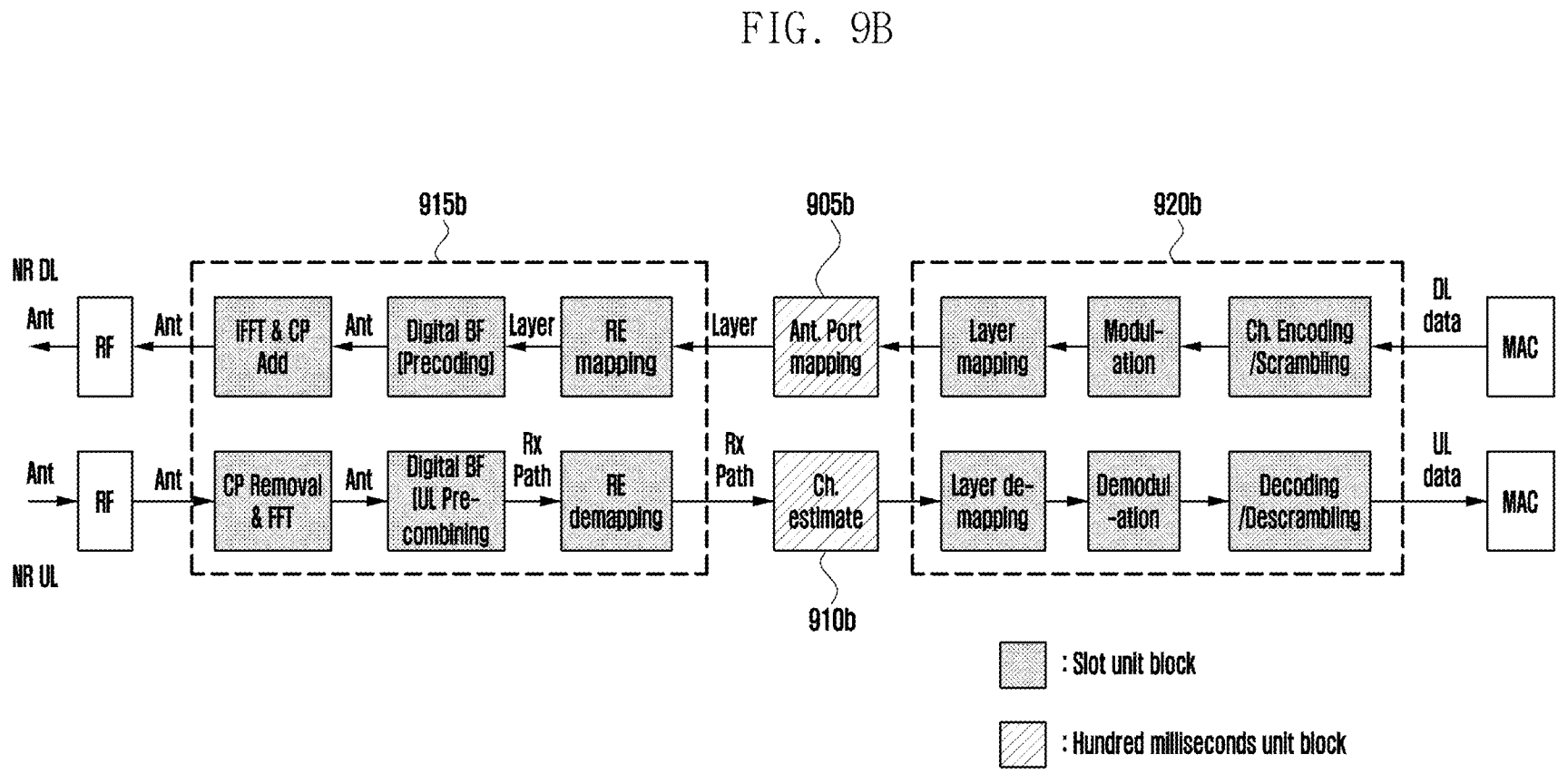

MAC
DL data
Ch. Encoding /Scrambling
Modul-ation
Layer mapping
920b
Ant. Port mapping
905b
Layer
RE mapping
Layer
Digital BF (Precoding)
Ant
IFFT & CP Add
915b
Ant
RF
Ant
NR DL MAC
UL data
Decoding /Descrambling
Demodul -ation
Layer de-mapping
Ch. estimate
910b
Rx Path
RE demapping
Rx Path
Digital BF (UL Pre-combining)
Ant
CP Removal & FFT
Ant
RF
Ant
NR UL : Slot unit block
: Hundred milliseconds unit block

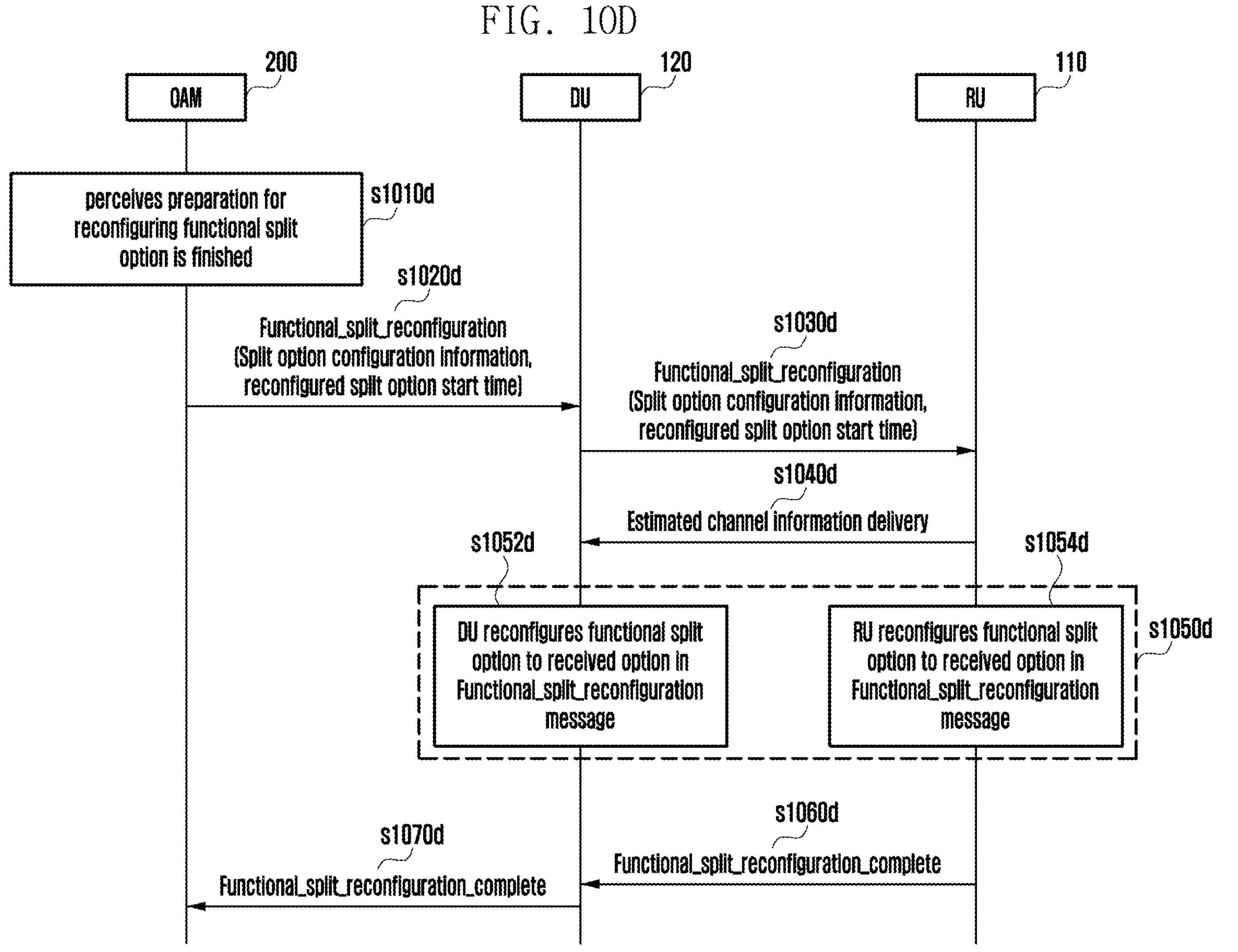
FIG. 10D
200
OAM
120
DU
110
RU
perceives preparation for reconfiguring functional split option is finished
s1010d
s1020d
Functional_split_reconfiguration
(Split option configuration information, reconfigured split option start time)
s1030d
Functional_split_reconfiguration
(Split option configuration information, reconfigured split option start time)
s1040d
Estimated channel information delivery
s1052d
s1054d
DU reconfigures functional split option to received option in Functional_split_reconfiguration message
RU reconfigures functional split option to received option in Functional_split_reconfiguration message
s1050d
s1060d
Functional_split_reconfiguration_complete
s1070d
Functional_split_reconfiguration_complete

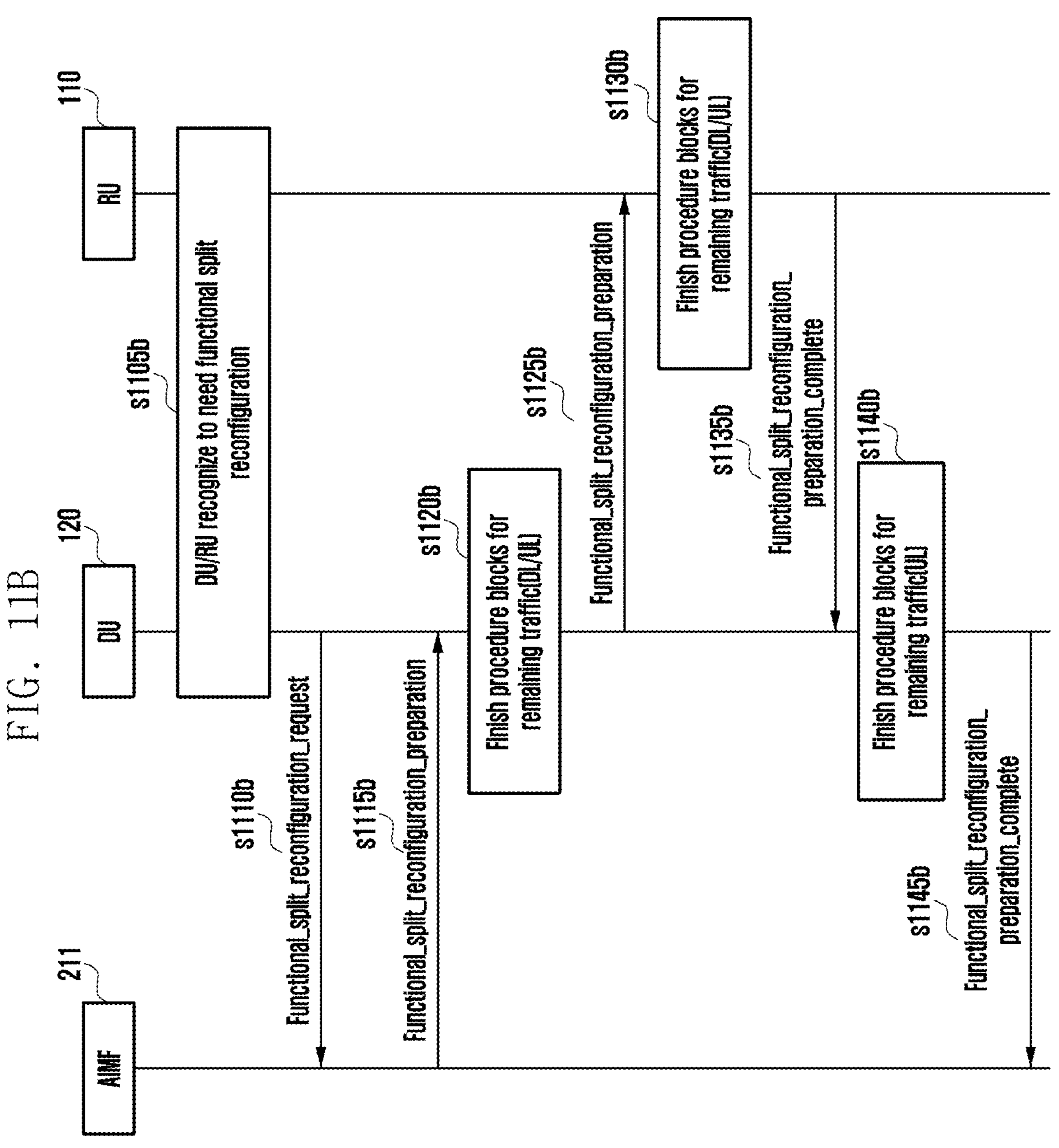
FIG. 11B
AIMF
211
DU
120
RU
110
DU/RU recognize to need functional split reconfiguration
s1105b
s1110b
Functional_split_reconfiguration_request
s1115b
Functional_split_reconfiguration_preparation
s1120b
Finish procedure blocks for remaining traffic(DL/UL)
s1125b
Functional_split_reconfiguration_preparation
s1130b
Finish procedure blocks for remaining traffic(DL/UL)
s1135b
Functional_split_reconfiguration_preparation_complete
s1140b
Finish procedure blocks for remaining traffic(UL)
s1145b
Functional_split_reconfiguration_preparation_complete

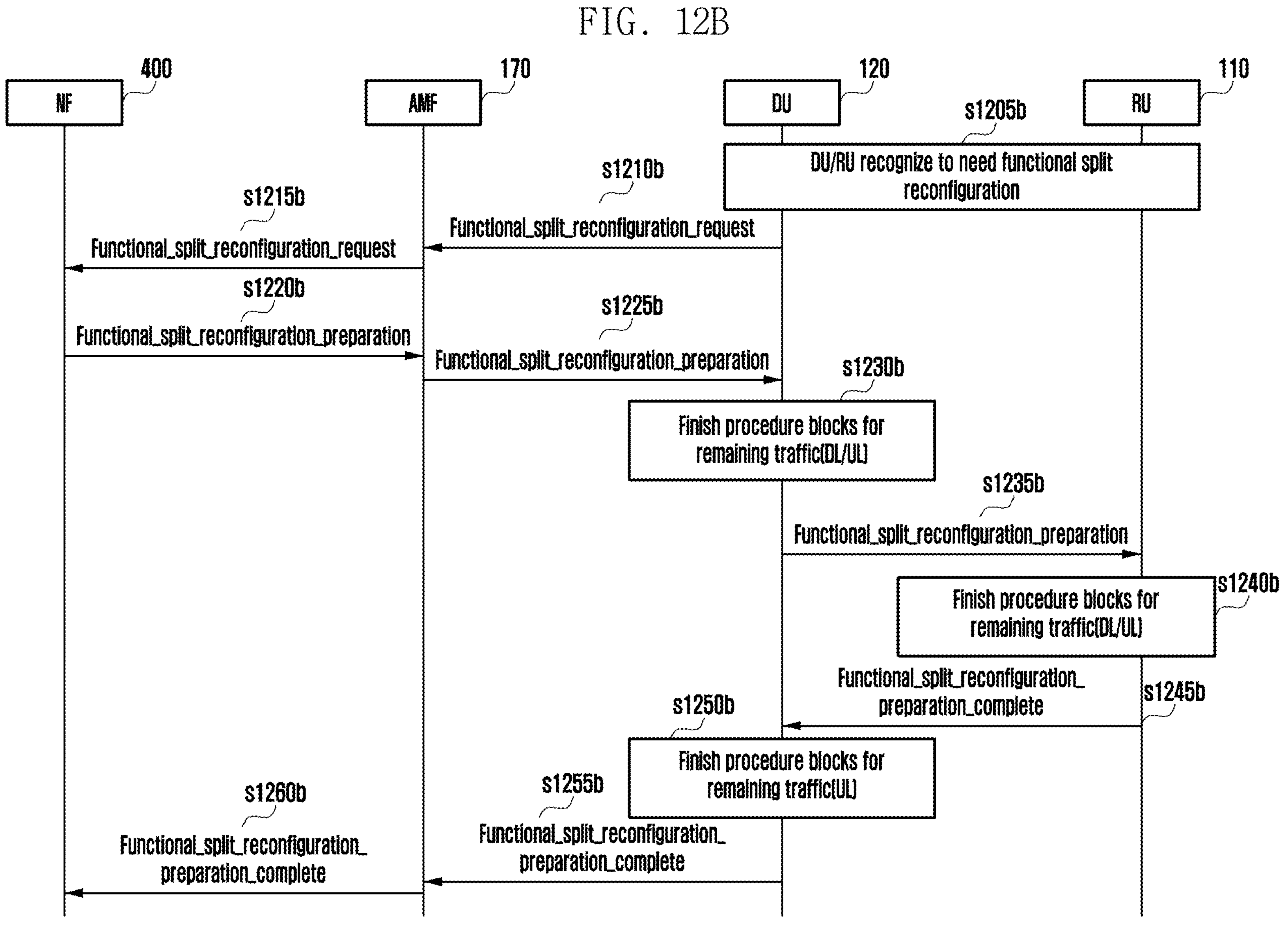
FIG. 12B
400
NF
170
AMF
120
DU
110
RU
s1205b
DU/RU recognize to need functional split reconfiguration
s1210b
Functional_split_reconfiguration_request
s1215b
Functional_split_reconfiguration_request
s1220b
Functional_split_reconfiguration_preparation
s1225b
Functional_split_reconfiguration_preparation
s1230b
Finish procedure blocks for remaining traffic(DL/UL)
s1235b
Functional_split_reconfiguration_preparation
s1240b
Finish procedure blocks for remaining traffic(DL/UL)
s1245b
Functional_split_reconfiguration_preparation_complete
s1250b
Finish procedure blocks for remaining traffic(UL)
s1255b
Functional_split_reconfiguration_preparation_complete
s1260b
Functional_split_reconfiguration_preparation_complete

Figure 12C:
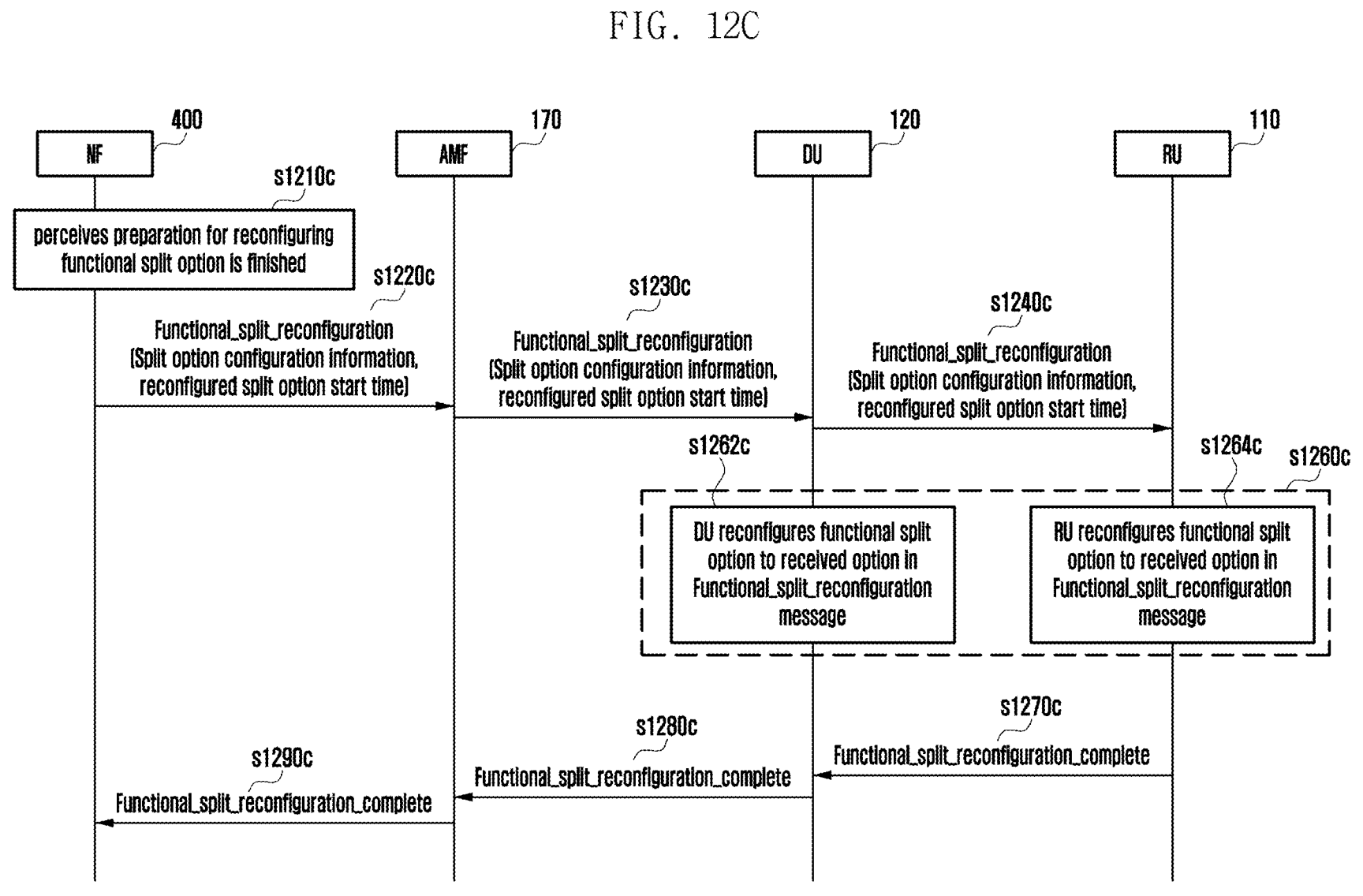

AMF 170

DU 120

RU 110 s1210c perceives preparation for reconfiguring functional split option is finished s1220c Functional_split_reconfiguration (Split option configuration information, reconfigured split option start time)

s1230c Functional_split_reconfiguration (Split option configuration information, reconfigured split option start time)

s1240c Functional_split_reconfiguration (Split option configuration information, reconfigured split option start time)

s1260c s1262c DU reconfigures functional split option to received option in Functional_split_reconfiguration message s1264c RU reconfigures functional split option to received option in Functional_split_reconfiguration message s1270c Functional_split_reconfiguration_complete s1280c Functional_split_reconfiguration_complete s1290c Functional_split_reconfiguration_complete

FIG. 12D

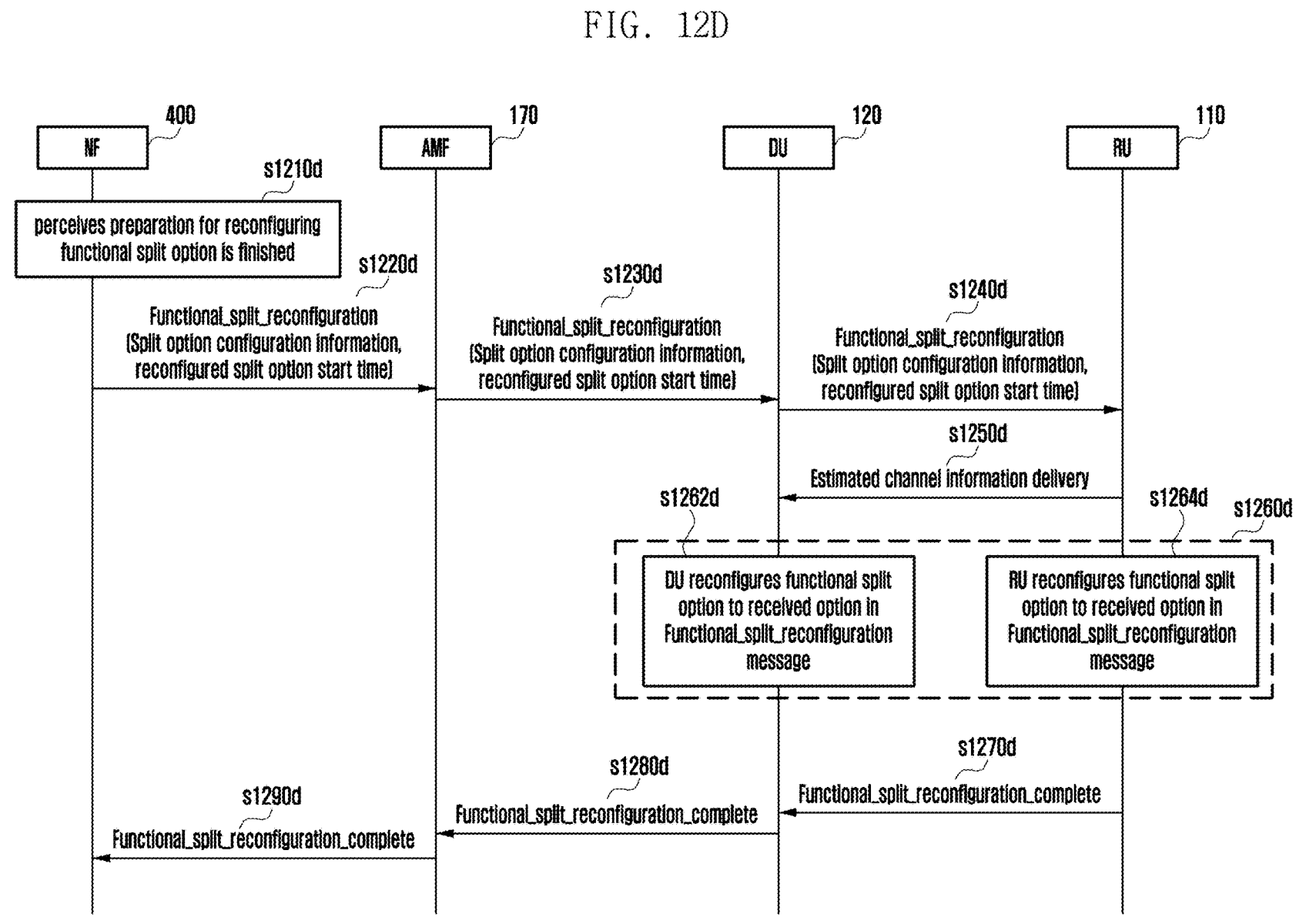

NF 400
AMF 170
DU 120
RU 110 s1210d perceives preparation for reconfiguring functional split option is finished s1220d Functional_split_reconfiguration (Split option configuration information, reconfigured split option start time)

s1230d Functional_split_reconfiguration (Split option configuration information, reconfigured split option start time)

s1240d Functional_split_reconfiguration (Split option configuration information, reconfigured split option start time)

s1250d Estimated channel information delivery s1260d s1262d DU reconfigures functional split option to received option in Functional_split_reconfiguration message s1264d RU reconfigures functional split option to received option in Functional_split_reconfiguration message s1270d Functional_split_reconfiguration_complete s1280d Functional_split_reconfiguration_complete s1290d Functional_split_reconfiguration_complete

METHOD AND APPARATUS FOR RECONFIGURATION FUNCTIONAL SPLIT OPTION OF DIGITAL UNIT AND RADIO UNIT IN WIRELESS COMMUNICATION SYSTEMS

CROSS REFERENCE TO RELATED APPLICATION

The present application claims priority to Korean Patent Application No. 10-2023-0069895, filed on May 31, 2023, the entire contents of which is incorporated herein for all purposes by this reference.

BACKGROUND

1. Field

The disclosure relates to the operation of digital unit (DU) and radio unit (RU) in a wireless communication system. More specifically, the disclosure relates to a method and apparatus for reconfiguring the functional split option of DU and RU for performing artificial intelligence (AI) functions in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 sec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

The disclosed embodiment is to provide an apparatus and method that can effectively provide services in a mobile communication system.

A method performed by a radio unit (RU) of a base station in a wireless communication system according to an embodiment of the disclosure may comprise preparing for a functional split reconfiguration, receiving a functional split reconfiguration message from a digital unit (DU) of the base station, and reconfiguring a functional split option so that an artificial intelligence (AI) function of the RU is moved to the DU based on split option reconfiguration information included in the functional split reconfiguration message.

A method performed by a digital unit (DU) of a base station in a wireless communication system according to an embodiment of the disclosure may comprise preparing for a functional split reconfiguration, receiving a functional split reconfiguration message from an artificial intelligence management function (AIMF), transmitting the functional split reconfiguration message to a radio unit (RU) of the base station, and reconfiguring a functional split option so that an artificial intelligence (AI) function of the RU is moved to the DU based on split option reconfiguration information included in the functional split reconfiguration message.

A radio unit (RU) of a base station in a wireless communication system according to an embodiment of the disclosure may comprise a transceiver configured to transmit and receive a signal, and a controller configured to prepare for a functional split reconfiguration, receive a functional split reconfiguration message from a digital unit (DU) of the base station, and reconfigure a functional split option so that an artificial intelligence (AI) function of the RU is moved to the DU based on split option reconfiguration information included in the functional split reconfiguration message.

A digital unit (DU) of a base station in a wireless communication system according to an embodiment of the disclosure may comprise a transceiver configured to transmit and receive a signal, and a controller configured to prepare for a functional split reconfiguration, receive a functional split reconfiguration message from an artificial intelligence management function (AIMF), transmit the functional split reconfiguration message to a radio unit (RU) of the base station, and reconfigure a functional split option so that an artificial intelligence (AI) function of the RU is moved to the DU based on split option reconfiguration information included in the functional split reconfiguration message.

The disclosed embodiments provide an apparatus and method that can effectively perform AI functions by reconfiguring functional split option in a mobile communication system.

The effects that can be obtained from the disclosure are not limited to the effects mentioned in the various embodiments, and other effects not mentioned will be clearly understood by those skilled in the art from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9B illustrates a diagram for explaining the functional split reconfiguration method described in FIG. 9A.

FIG. 10D illustrates a signal flow diagram of a functional split performing process by OAM, RU, and DU, including a channel information transmission process, according to an embodiment of the disclosure.

FIG. 11B illustrates a signal flow diagram of a functional split preparation process by AIMF, RU, and DU according to an embodiment of the disclosure.

FIG. 12B illustrates a signal flow diagram of a functional split preparation process by NF, AMF, RU, and DU according to an embodiment of the disclosure.

FIG. 12C illustrates a signal flow diagram of a functional split performing process by NF, AMF, RU, and DU according to an embodiment of the disclosure.

FIG. 12D illustrates a signal flow diagram of a functional split performing process by NF, AMF, RU, and DU including a channel information transmission process according to an embodiment of the disclosure.

DETAILED DESCRIPTION

Figure 1:
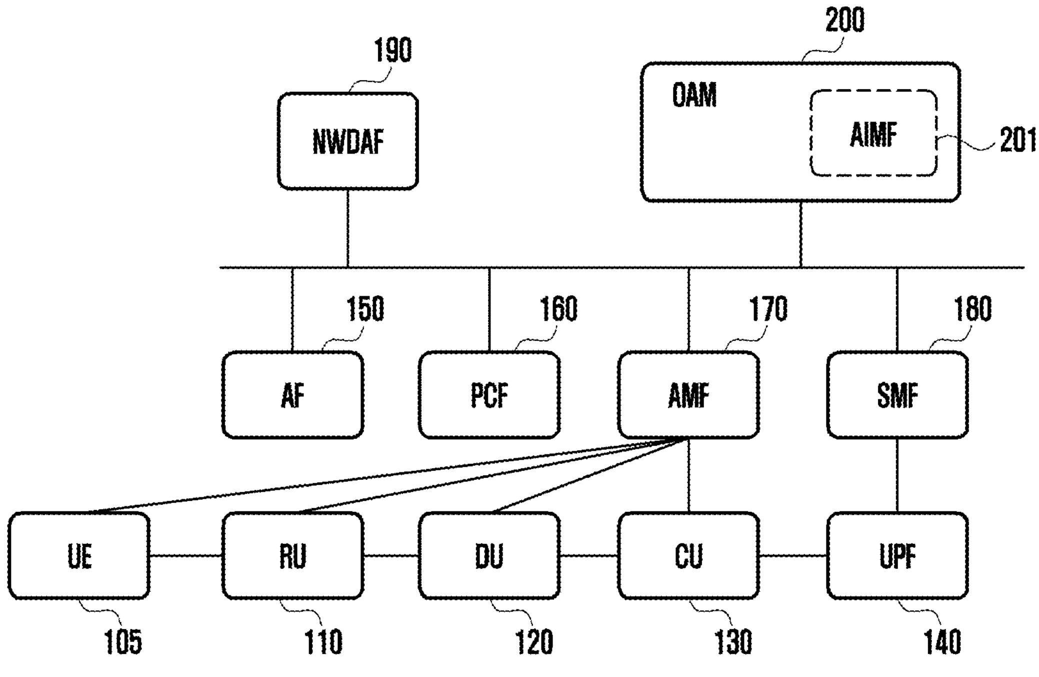
FIG. 1 illustrates a diagram of a wireless communication system including operation, administration, and maintenance (OAM) according to an embodiment of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or constitutions incorporated herein will be omitted in case that it is determined that the description may make the subject matter of the disclosure unnecessarily unclear. The terms which will be described below are terms defined in consideration of the functions in the disclosure, and may be different according to intentions of the users and operators, or customs. Therefore, the definitions of the terms should be made based on the contents throughout the specification.

Hereinafter, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio transmission path via which a base station transmits a signal to a terminal, and an "uplink (UL)" refers to a radio transmission path via which a terminal transmits a signal to a base station. Further, hereinafter, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and hereinafter, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. Because these computer program instructions may be embedded in a processor of a general-purpose computer, a special-purpose computer, or other programmable data processing apparatuses, the instructions executed through the processor of the computer or other programmable data processing apparatus generates means for performing the functions described in the flowchart block(s). Because these computer program instructions may also be stored in a computer usable or computer-readable memory that may direct the computer or other programmable data processing apparatus so as to implement functions in a particular manner, the instructions stored in the computer usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the corresponding functionality involved.

As used herein, the “unit” refers to a software element or a hardware element, such as a Field Programmable Gate Array (FPGA) or an Application Specific Integrated Circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and “units” may be combined into fewer components and “units” or may be further separated into additional components and “units”. Further, the components and “units” may be implemented to operate one or more CPUs in a device or a secure multimedia card. In addition, in an embodiment, “units” may include one or more processors. Hereinafter, a/b may be understood as at least one of a and b.

The term ‘AI function’ used in this embodiment may be understood as a function that performs a specific function in each layer of a wireless communication system using AI technology. For example, the AI function may be a function used in a channel encoding/scrambling process in a physical layer (PHY) below a media access control (MAC) layer. In addition, the AI function may be applied to layers such as low-PHY, high-PHY, low-MAC, and high-MAC. For example, the AI function may refer to function such as channel state information compression (CSI compression), CSI prediction, AI noise canceling (AI-NC), and AI multiple-input and multiple-output (AI-MIMO).

The term ‘state of AI function’ used in this embodiment may indicate the state of the AI modeling process when performing an AI function. For example, the AI modeling process may include a data collection process that collects data from a UE or RU, an AI model training process that learns the collected data, an AI model inference process that inputs collected data or new data into a trained AI model to derive results, an AI model performance feedback process that provides feedback on the performance of the AI model using the results obtained through the AI model inference process, an AI model upgrade process that upgrades (updates) the AI model through the feedback or additional learning about the AI model performance, and an operation process that performs specific actions by receiving results operated through the AI model inference. The state of the AI function may refer to the state of any of the above processes.

In addition, hereinafter, various embodiments of the disclosure are described using a system based on LTE, LTE-A, NR, or 6G as an example, but various embodiments of the disclosure may also be applied to other communication systems with similar technical background or channel type. In addition, the various embodiments of the disclosure may be applied to other communication systems through some modifications without significantly departing from the scope at the discretion of those with skilled technical knowledge.

FIG. 1 illustrates a diagram of a wireless communication system including operation, administration, and maintenance (OAM).

With reference to FIG. 1, the respective functions provided by the 5G network system may be performed on a network function (NF) basis. Here, the network function may mean a set of network services. Specifically, the 5G network may include at least one of an access and mobility management function (AMF) 170 that manages the network access and mobility of a UE 105, a session management function (SMF) 180 that performs functions related to sessions for the UE 105, a user plane function (UPF) 140 that is in charge of transferring user data and is controlled by the SMF 180, an application function (AF) 150 that communicates with 5GC to provide application services, a network exposure function (NEF) (not shown) that supports communication with the AF 150, a unified data management (UDM) (not shown) and unified data repository (UDR) (not shown) for data storage and management, a policy and control function (PCF) 160 for managing policies, and a data network (DN) (e.g., the Internet) where user data is transferred.

In addition to the above-described NFs, there may be an operation, administration, and management (OAM) server 200 that is a system for managing the UE 110 and the 5G mobile communication network. Here, the OAM may be an external server connected to the base station, core network, and Internet network. In addition, the 5G network may include a base station’s radio unit (RU) (hereinafter, RU) 110, a base station’s digital unit (DU) (hereinafter, DU) 120, and a base station’s central unit (CU) (hereinafter, CU) 130, and may further include at least one of an authentication server function (AUSF) (not shown), a network slice selection function (NSSF) (not shown), a network data analytics function (NWDAF) 190, and a network repository function (NRF) (not shown). Here, the NWDAF 190 may collect network data in various manners from at least one source NF, for example, NFs in a 5G core network such as the AMF 170, SMF 180, or UPF 140, the AF 150 for efficient service provision, the NEF, or the OAM 200.

According to an embodiment, the OAM 200 of the disclosure may include an AI management function (AIMF) 201 function. Hereinafter, in the disclosure, the AIMF 201 may refer to a management function that performs various functions, such as network maintenance, failure diagnosis and recovery support, and optimizing resource allocation through an AI model. In addition, the AIMF 201 may refer to a management function that monitors changes in the network environment and identifies services needed by the DU 120 or RU 110. In the disclosure, the node having the above management function is referred to as AIMF, but it is not necessarily limited to this term and may refer to all future nodes performing similar functions.

The OAM 200 of the disclosure may further include an AI inference function (AIIF), an AI evaluation function (AIEF), and an AI training function (AITF) functions. The OAM 200 may include other AI functions not specified in the disclosure that perform specific processes of AI functions.

Hereinafter, in the disclosure, the AIIF function may be a function that performs an inference task on new data using a trained AI model. In the disclosure, a node that has the function of performing data inference tasks using the AI model is referred to as AIIF, but it is not necessarily limited to this term and may refer to all future nodes that perform similar functions.

In addition, in the disclosure, the AIEF function may refer to a function that evaluates and improves the performance of an AI model. In the disclosure, the node that has the function of evaluating and improving the performance of the AI model is referred to as AIEF, but it is not necessarily limited to this term and may refer to all future nodes that perform similar functions.

In addition, in the disclosure, the AITF function may be a function that performs learning of an AI model. In the disclosure, the node that has the function of performing learning of the AI model is referred to as AITF, but it is not necessarily limited to this term and may refer to all future nodes that perform similar functions.

Figure 2:
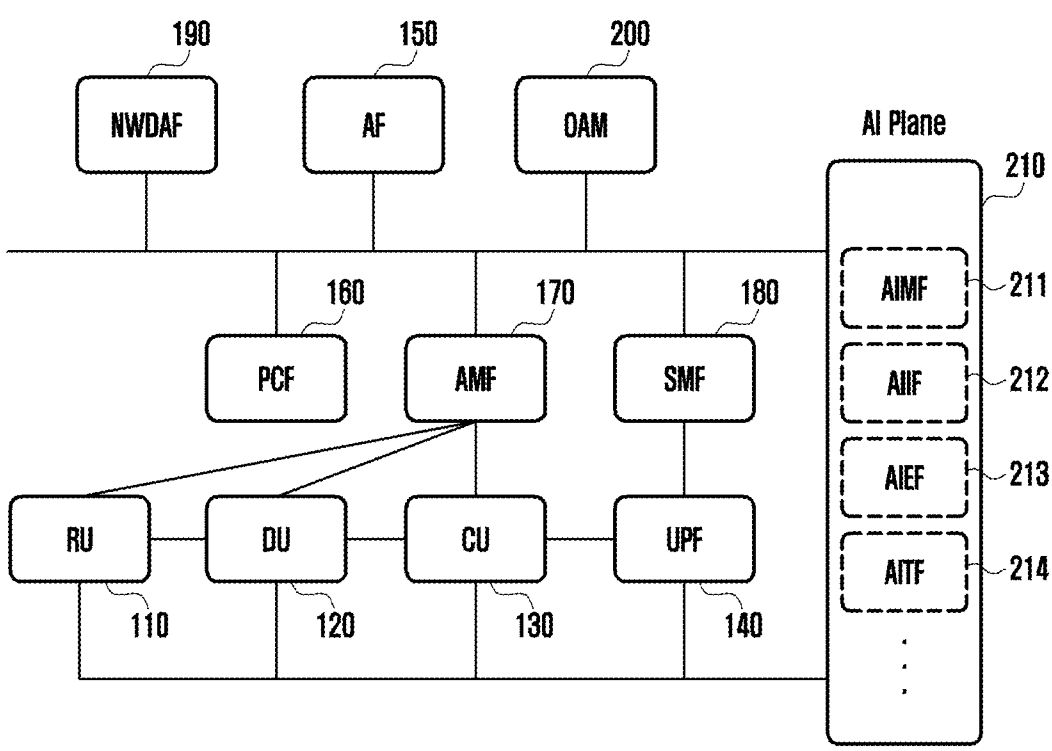
FIG. 2 illustrates a diagram of a wireless communication system including an artificial intelligence (AI) plane according to an embodiment of the disclosure.

FIG. 2 illustrates a diagram of a wireless communication system including an AI plane.

With reference to FIG. 2, the wireless communication system in FIG. 2 may include the NFs described in FIG. 1. Hereinafter, the description about NFs described in FIG. 1 will be replaced with the description of FIG. 1 above.

The wireless communication system in FIG. 2 may be a wireless communication system in which the AIMF 211, AIIF 212, AIEF 213, and AITF 214 functions described in FIG. 1 are implemented in the AI plane 210. Other AI functions not specified in the disclosure that perform specific processes of AI functions may be in addition implemented in the AI plane 210. For example, an AI data repository function (ADRF) (not shown) may be in addition implemented in the AI plane 210. Here, the AIMF 211 may be a node that performs the same function as the AIMF 201 illustrated in FIG. 1.

The AI plane of the disclosure may be a virtual plane that virtualizes AI functions and allows separate network functions to be performed, such as a control plane (CP) or user plane (UP) of a 5G network.

The AIMF 211 of the disclosure is not limited to the AI plane 210 and may be implemented in the CP or management plane (MP). That is, the AIMF 211 may be distributed and deployed in the respective NFs.

The RU 110 of the disclosure described with reference to FIGS. 1 and 2 may be provided with an adaptive compute acceleration platform (ACAP) function. The RU 110 may perform AI functions as the ACAP function is added.

In case that an AI function is added to the RU 110, the AI model included in the RU may be frequently upgraded. For example, after training the AI model, an upgrade may be performed to install a high-performance trained AI model (updated AI model) in the RU 110. In addition, for example, after upgrading the AI model, subsequent additional upgrades may be performed in case that unexpected performance degradation of the AI model occurs. Alternatively, an upgrade may be performed for the purpose of changing the structure and technical aspects of the AI model included in the RU 110.

In addition, in case that an AI function is added to the RU 110, there may be limitations in application of the AI function due to hardware limitations of the RU 110, that is, limitations in storage space or memory. For example, when collecting data for AI learning, additional data storage space may be required, and there may be cases where AI functions with reduced performance are installed in the RU 110 due to the characteristics of ACAP hardware and RU storage space limitations.

In order to solve the problem due to the addition of the AI function to the above-described RU 110, the OAM 200 in which the AIMF 201 may perform a function of reconfiguring the functional split option of DU and RU. Alternatively, the AIMF 210 implemented on the AI plane 200 may perform the function of reconfiguring the functional split option of DU and RU, and the functional split option of DU and RU may be reconfigured through the NF and AMF 170 on the core network. The functional split reconfiguration (functional split option reconfiguration) method of the disclosure will be described again later.

According to some embodiments of the disclosure, the RU 110 may refer to a set of a plurality of RUs located at different points.

In case that the RU 110 refers to a set of a plurality of RUs located at different points, in some embodiments of the disclosure below, a set of a plurality of RUs connected to the DU 120 may each receive the same message from one DU 120. For example, the DU 120 that has received the functional split reconfiguration message from the OAM 200 may transmit the same functional split reconfiguration message to each RU of the set of a plurality of RUs. Here, the functional split reconfiguration message will be described again later.

In addition, the DU 120 of the disclosure may include a set of Dus, each corresponding to each of a plurality of RUs. In this case, in some embodiments of the disclosure, the DU 120 may receive a plurality of functional split reconfiguration messages, each corresponding to each of a plurality of Dus, from the OAM 200, and transmit a plurality of functional split reconfiguration messages, each corresponding to each of the plurality of DUs. For example, the DU 120 may transmit a first functional split reconfiguration message corresponding to a first RU to the first RU, and transmit a second functional split reconfiguration message corresponding to a second RU to a second RU.

In some embodiments of the disclosure below, each of the RU 110 and DU 120 may be provided with an AI function capable of performing all AI modeling processes. In this case, hereinafter, in the disclosure, 'the AI function is moved from the RU 110 to the DU 120 according to reconfiguration of the functional split option' may actually mean applying (ON) the AI function previously provided in the RU 110 and deactivating (OFF) the AI function previously provided in the DU 120.

In some embodiments of the disclosure below, each of the RU 110 and DU 120 may be a virtualized server in a container environment. In this case, hereinafter in the disclosure, 'moving the AI function from the RU 110 to the DU 120 according to reconfiguration of the functional split option' actually means deleting the AI function from the RU 110 and adding the AI function to the DU 120.

Figure 3:
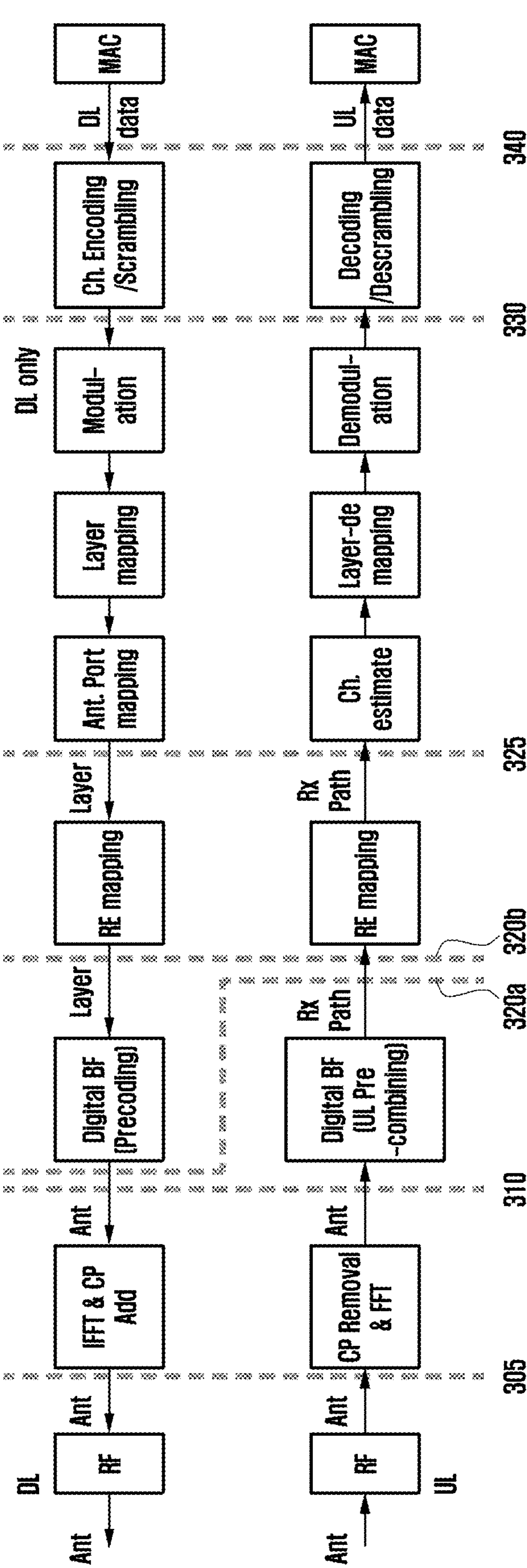
FIG. 3 illustrates a diagram of an example of functional split in a wireless communication system according to various embodiments of the disclosure.

FIG. 3 illustrates a diagram of an example of functional split in a wireless communication system according to various embodiments of the disclosure.

With reference to FIG. 3, functional splits in the physical layer below the MAC layer are illustrated. For the DL PHY function that transmits signals to the UE through a wireless network, the base station (including RU, DU, and/or CU) may sequentially perform channel encoding/scrambling, modulation, layer mapping, antenna mapping, resource element (RE) mapping, digital beamforming (e.g., precoding), IFFT conversion/CP insertion, and radio frequency (RF)

conversion. For the UL PHY function that receives signals from the UE through a wireless network, the base station may sequentially perform RF conversion, FFT conversion/CP removal, digital beamforming (pre-combining), RE de-mapping, channel prediction, layer de-mapping, demodulation, and decoding/descrambling. The split of uplink functions and downlink functions may be defined in various types depending on the need between vendors (vendors), discussions on specifications, etc. according to the trade-off described above.

A first functional split 305 may be split of RF function and PHY function. The first functional split 305 is one in which the PHY function within the RU is not substantially implemented, and may be referred to as Option 8, for example. A second functional split 310 allows the RU to perform IFFT conversion/CP insertion in the DL of the PHY function and FFT conversion/CP removal in the UL of the PHY function, and the DU to perform the remaining PHY functions. As an example, the second functional split 310 may be referred to as Option 7-1. A third functional split 320*a* allows the RU to perform IFFT conversion/CP insertion in the DL of the PHY function and FFT conversion/CP removal and digital beamforming in the UL of the PHY function, and the DU to perform the remaining PHY functions. As an example, the third functional split 320*a* may be referred to as Option 7-2× Category A. A fourth functional split 320*b* allows the RU to perform digital beamforming in both DL and UL, and the DU to perform higher PHY functions after digital beamforming. As an example, the fourth functional split 320*b* may be referred to as Option 7-2× Category B. A fifth functional split 325 allows the RU to perform RE mapping (or RE de-mapping) in both DL and UL, and the DU to perform higher PHY functions after RE mapping (or RE de-mapping). As an example, the fifth functional split 325 may be referred to as Option 7-2. A sixth functional split 330 allows the RU to perform modulation (or demodulation) in both DL and UL, and the DU to performs higher PHY functions including encoding/scrambling (or decoding/descrambling) after modulation (or demodulation). As an example, the sixth functional split 330 may be referred to as Option 7-3. A seventh functional split 340 allows the RU to perform encoding/scrambling (or decoding/descrambling) in both DL and UL, and the DU to perform subsequent higher PHY functions. As an example, the seventh functional split 340 may be referred to as Option 6.

According to various embodiments in the disclosure, functional split options may be reconfigured by taking into account information about the state of the RU 110 and information about the state of the DU 120. For example, in case that the RU 110 performs AI model learning, the functional split option of the base station may be reconfigured from the seventh functional split 340 option to the sixth functional split 330 option.

Here, the information about the state of the RU 110 or DU 120 may mean at least one of hardware constraints, wireless communication environment, other environmental constraints, and AI function states of the RU 110 or DU 120. Here, the state of the RU 110 or DU 120 may in addition include various matters that may be considered when applying the AI function to the RU 110 and DU 120 in addition to the matters described above.

According to various embodiments in the disclosure, whether to reconfigure the functional split option may be determined by the RU 110 and/or DU 120, may be determined by the OAM 200, and may be determined by the AIMF 211, and further, may be determined by any one NF of the core network.

According to various embodiments in the disclosure, the reconfiguration of functional split option may be initiated by the OAM 200, AIMF 211, or NF of the core network.

The specific method and signal flow processes of functional split option reconfiguration will be described in detail again in FIGS. 4 to 15.

Next, a functional split reconfiguration method according to some embodiments of the disclosure will be described with reference to FIGS. 4 to 8. Hereinafter, in describing the method according to this embodiment, description of a subject performing some operations may be omitted. In this case, it may be understood that the subject performing the corresponding operation is the DU 120 or RU 110. In addition, in FIGS. 4 to 8 below, the AI management function may be replaced by the AIMF 211, NF, or OAM 200. Here, in case that the AI management function is NF, the NF may transmit and receive messages through the AMF 170.

Figure 4:
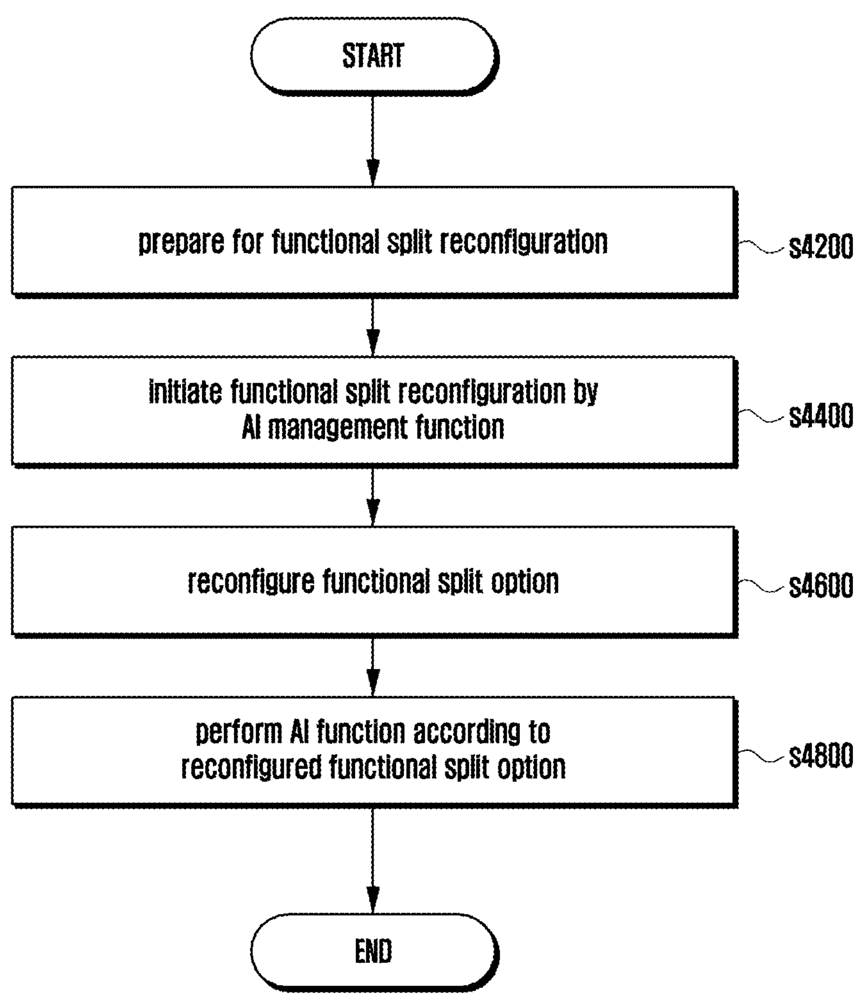
FIG. 4 illustrates a diagram of a functional split reconfiguration method according to an embodiment of the disclosure.

FIG. 4 illustrates a diagram of a functional split reconfiguration method according to an embodiment of the disclosure.

With reference to FIG. 4, in operation s4200, a preparation operation for reconfiguring functional split option may be initiated by the AI management function. Specific embodiments of the preparation operation for reconfiguring functional split option will be described again with reference to FIGS. 5A and 5B.

Figure 5A:
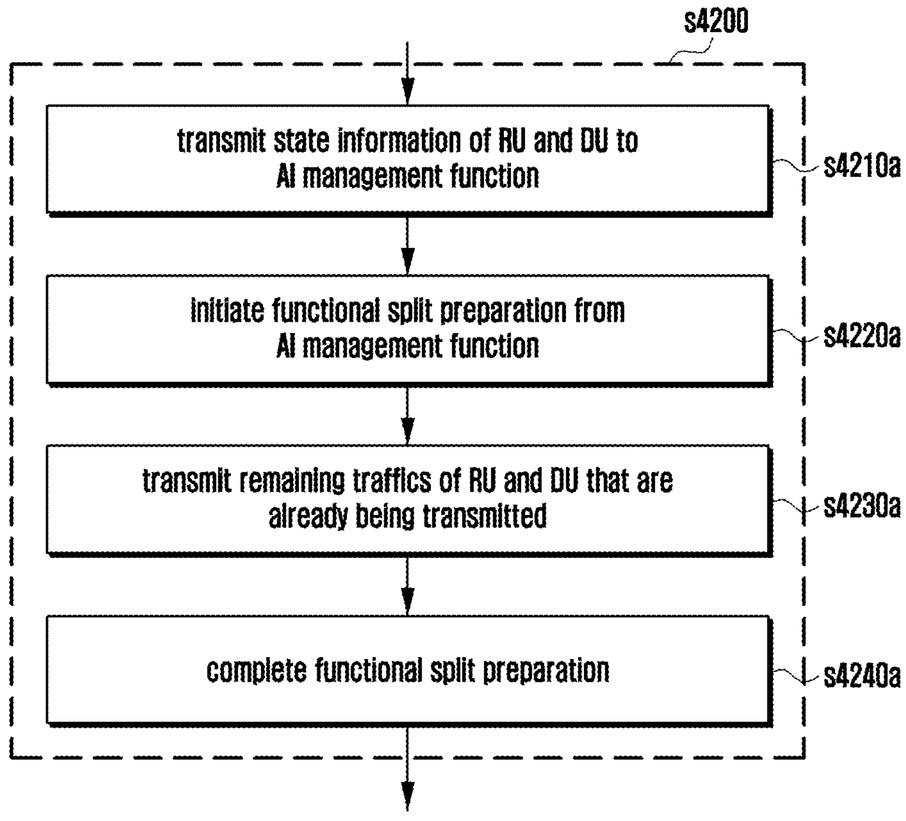
FIG. 5A illustrates a diagram of an embodiment of the functional split reconfiguration preparation method described with reference to FIG. 4.

With reference to FIG. 5A, in operation s4210*a*, information about the state of the RU 110 and information about turning off the DU 120 may be transmitted to the AI management function.

According to an embodiment, the DU 120 receives information about the state of the RU 110 from the RU 110 and then may transmit the information about the state of the RU 110 and the information about the state of the DU 120 to the AI management function.

In operation s4220*a*, the AI management function determines whether to perform functional split based on the information about the state of the RU 110 and the information about the state of the DU 120, and in case that functional split is necessary, the AI management function may initiate preparation for functional split. The AI management function may determine that the functional split is required for the embodiments described in FIGS. 6 to 8 below.

According to an embodiment, the AI management function may consider hardware constraints of the RU 110 or DU 120, wireless communication environment, other environmental constraints, or AI function state, and in addition to the above-mentioned matters, additionally consider various matters that may be considered when applying the AI function to the RU 110 and DU 120 to determine whether it is necessary to reconfigure the functional split option. Further, in case that functional split is necessary, the AI management function may transmit, to the DU 120, a functional split reconfiguration preparation message including functional split option information to be changed.

Here, the functional split reconfiguration preparation message may be as follows.

- In case that the RU 110 refers to a set of a plurality of RUs located at different points, it may be the functional split reconfiguration preparation message that is equally transferred from one DU 120, respectively, for a set of a plurality of RUs connected to the DU 120. For example, the DU 120, which has received a functional split reconfiguration preparation message from the AI management function, may transmit the same functional split reconfiguration preparation message to each RU of the set of a plurality of RUs.

In case that the DU 120 of the disclosure includes a set of Dus, each corresponding to each of a plurality of RUs, it may be a plurality of functional split reconfiguration preparation messages, each corresponding to each of the plurality of DUs transmitted from the AI management function to the DU 120. For example, the DU 120, which has received the functional split reconfiguration preparation message including the functional split reconfiguration information corresponding to each of the plurality of RUs from the AI management function, may transmit a first functional split reconfiguration preparation message corresponding to the first RU, and transmit a second functional split reconfiguration preparation message corresponding to the second RU to the second RU. Each functional split reconfiguration preparation message may include different functional split option information.

Here, the case where reconfiguration of the functional split option is necessary may, for example, correspond to an embodiment that will be described later with reference to FIGS. 6 to 8.

In operation s4230*a*, in case that the functional split preparation is initiated by the AI management function, the DU 120 may continue to transmit the remaining UL/DL traffic s that are already being transmitted. In addition, the RU 110 may receive the functional split preparation message from the DU 120 and transmit the remaining UL/DL traffics already being transmitted.

In operation s4240*a*, in case that both the RU 110 and the DU 120 have completed transmitting the remaining traffics, the DU 120 may identify whether all the remaining traffics of the RU 110 and DU 120 have been transmitted, and then transmit the functional split preparation complete message to the AI management function. In case that the functional split preparation complete message is transmitted to the AI management function, the AI management function may determine that preparation for functional split has been completed.

Figure 5B:
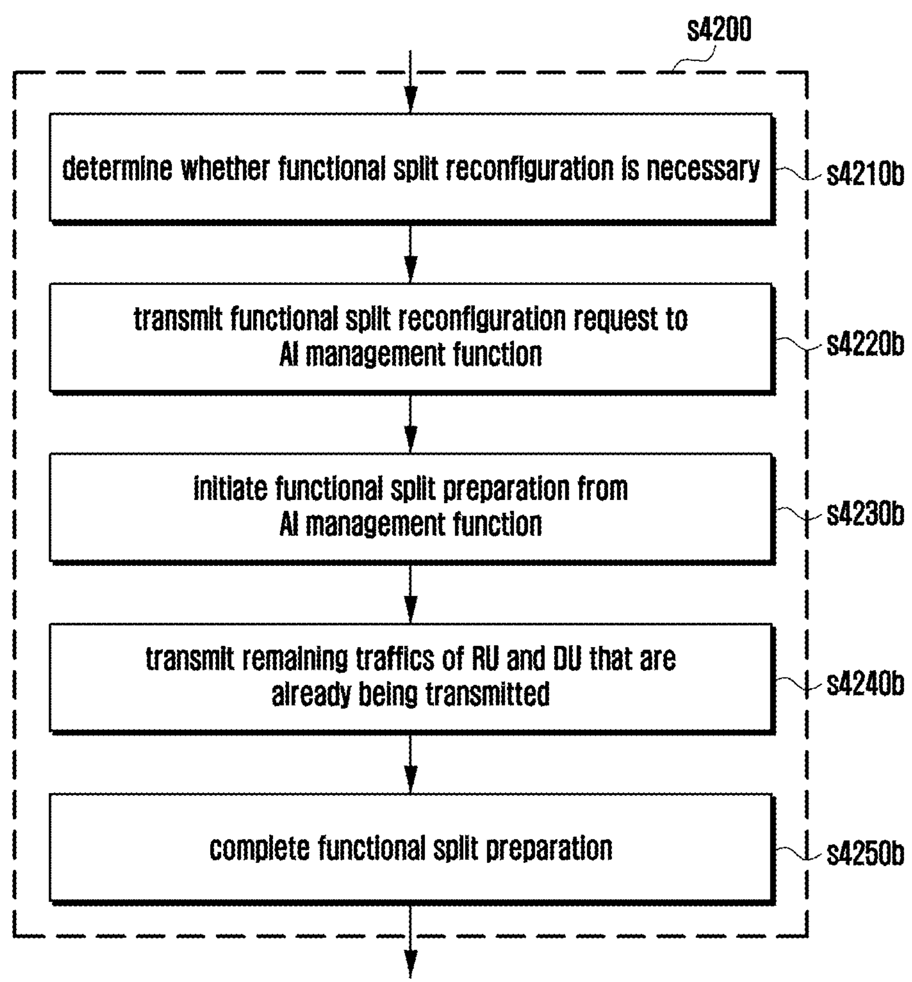
FIG. 5B illustrates a diagram of an embodiment of the functional split reconfiguration preparation method described with reference to FIG. 4.

With reference to FIG. 5B, in operation s4210*b*, it may be determined whether to perform functional split reconfiguration based on the information about the state of the RU 110 and the information about the state of the DU 120.

In operation s4220*b*, in case that it is determined that functional split reconfiguration is necessary, a functional split reconfiguration request message may be transmitted to the AI management function.

According to an embodiment, the DU 120 receives the information about the state of the RU 110 from the RU 110 and determines whether the functional split is necessary by considering the hardware constraints of the RU 110 and DU 120, wireless communication environment, other environmental constraints, or AI function state, and in addition to the above-mentioned matters, additionally considering various matters that may be considered when applying the AI function to the RU 110 and DU 120. In case that the functional split is necessary, the DU 120 may transmit a functional split reconfiguration request message to the AI management function.

According to an embodiment, the DU 120 may determine that functional split is necessary for embodiments to be described with reference to FIGS. 6 to 8 below.

According to an embodiment, the RU 110 may determine whether to perform functional split reconfiguration based on the information about the state of the RU 110 and transmit a functional split reconfiguration request message to the DU 120. In this case, the DU 120 may transmit the functional split reconfiguration request message to the AI management function.

According to an embodiment, the RU 110 may determine whether to perform functional split reconfiguration based on the information about the state of the RU 110 and transmit a functional split reconfiguration request message to the DU 120. In this case, the DU 120 comprehensively considers the information about the state of the RU 110 and the information about the state of the DU 120, and in case that reconfiguration of the functional split option is necessary, the RU 110 may transmit a functional split reconfiguration request message for the RU 110 and DU 120 to AI management function.

In operation s4230*b*, in case that the AI management function receives the functional split reconfiguration request message from the DU 120, the AI management function may initiate functional split preparation by transmitting a functional split preparation message to the DU 120.

In operation s4240*b*, in case that preparation for functional split is initiated by the AI management function, the DU 120 may continue to transmit the remaining UL/DL traffics that are already being transmitted. In addition, the RU 110 may receive a functional split preparation message from the DU 120 and transmit the remaining UL/DL traffics already being transmitted by the RU 110.

In operation s4250*b*, in case that both the RU 110 and the DU 120 have completed transmitting the remaining traffics, the DU 120 may identify whether all the remaining traffics of the RU 110 and DU 120 have been transmitted and then transmit a functional split preparation complete message to the AI management function. In case that the functional split preparation complete message is transmitted to the AI management function, the AI management function may determine that preparation for functional split has been completed.

With reference again to FIG. 4, in operation s4400, functional split reconfiguration may be initiated by the AI management function.

According to an embodiment, in case that the AI management function determines that preparation for functional split has been completed, it may transmit a functional split reconfiguration message to the DU 120.

According to an embodiment, in case that the AI management function receives the functional split preparation request message from the DU 120, it may transmit the functional split reconfiguration message to the DU 120.

Here, the target to which the functional split reconfiguration message is transmitted may be the RU 110 and/or the DU 120.

At operation s4600, functional split option may be reconfigured, changing the location of AI function.

For example, the location of the AI function may be changed from the RU 110 to the DU 120, or the location of the AI function may be changed from the DU 120 to the RU 110.

According to an embodiment, the RU 110 and/or DU 120 may reconfigure at least one DL PHY function, including an encoding/scrambling function configured to be performed on the RU 110, to be performed on the DU 120, and may reconfigure at least one UL PHY function, including a decoding/descrambling function configured to be performed in the RU 110, to be performed on the DU 120.

At operation s4800, the AI function according to the reconfigured functional split option may be performed.

For example, in case that the AI function is moved from the RU 110 to the DU 120, the AI function may be performed on the DU 120. Alternatively, in case that the AI function is moved from the DU 120 to the RU 110, the AI function may be performed on the RU 120.

Embodiments in which the AI function is performed according to the reconfigured functional split option may include, for example, embodiments to be described with reference to FIGS. 6 to 8 below.

Figure 6:
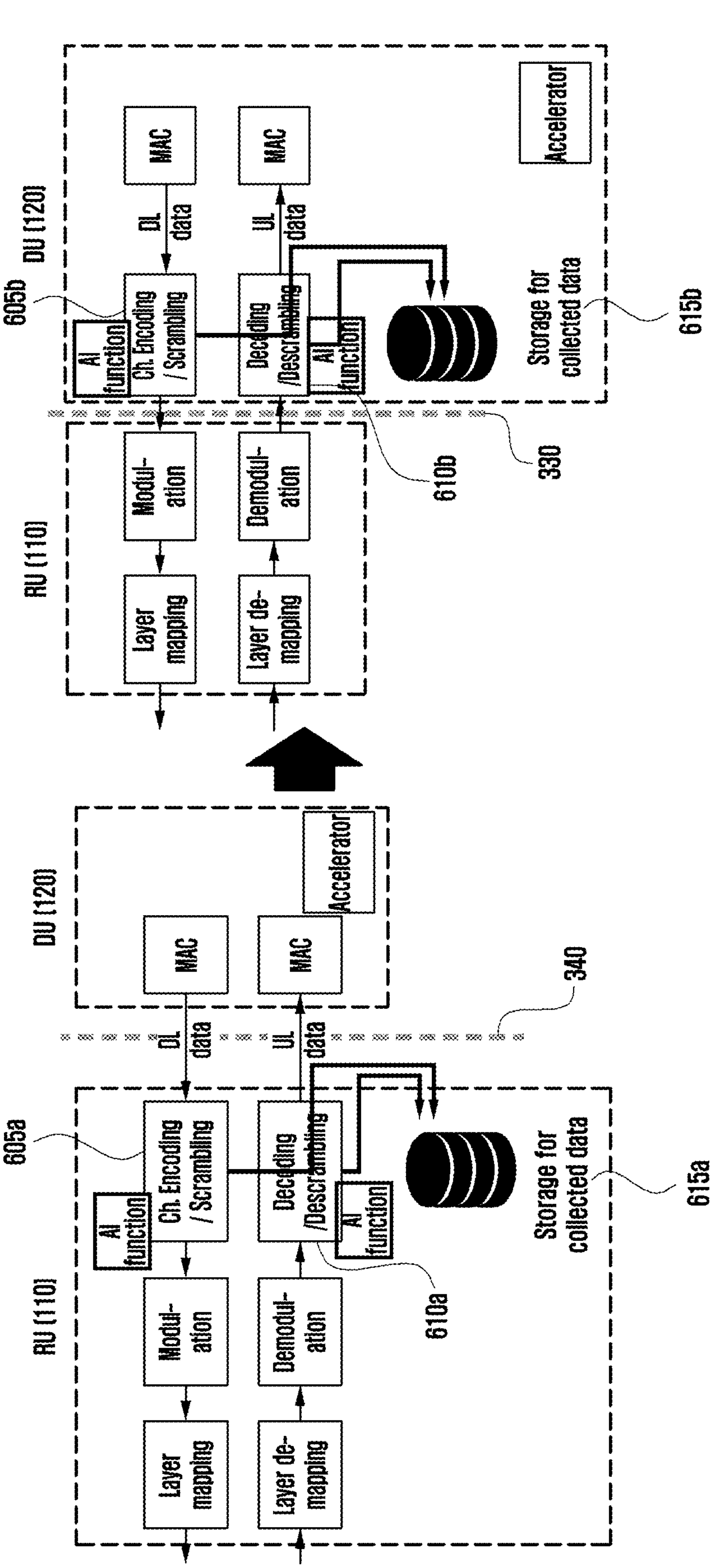
FIG. 6 illustrates a diagram of an embodiment of functional split reconfiguration based on the state of an AI function according to an embodiment of the disclosure.

FIG. 6 illustrates a diagram of an embodiment of functional split reconfiguration based on the state of an AI function according to an embodiment of the disclosure.

With reference to FIG. 6, in case that the AI function is applied to the channel encoding/scrambling (or channel decoding/scrambling) process, the AI function application structure of the RU 110 and DU 120 before and after reconfiguring the functional split option is illustrated.

In the case before reconfiguring the functional split option, the seventh functional split 340 option may be applied. That is, in both DL and UL, the RU 110 performs up to channel encoding/scrambling 605*a* (or channel decoding/scrambling 610*a*), and the DU 120 may be in a state to perform subsequent higher functions.

For example, assuming that a data collection process is performed in the RU 110 with the seventh functional split 340 option applied, the data that is collected through the data collection process may be stored in a data storage 615*a* included in the RU 110. Alternatively, it may be assumed that an AI model upgrade process is performed in addition to the data collection process.

In this case, there is a risk of reaching the limit of data storage capacity due to hardware limitations of the RU 110.

In order to resolve concerns due to the hardware constraints, in case that it is determined that reconfiguration of the functional split option is necessary, reconfiguration of the functional split option may be performed. In case that functional split option reconfiguration is performed, the seventh functional split 340 option may be reconfigured to the sixth functional split 330 option. In this case, the DU 120 may perform up to channel encoding/scrambling 605*b* (or channel decoding/scrambling 610*b*). In addition, the data collected through the data collection process may be stored in the data storage 615*b* included in the DU 120. In case that the AI function is moved to the DU 120 as the functional split option is reconfigured, the DU 120 may generate a trained AI model through an AI model learning process after the data collection, and the trained AI model may be transmitted to the RU 110.

According to an embodiment, in case that the AI function is initially installed in the RU 110, the AI model may be frequently updated until the AI function is stabilized, so reconfiguration of functional split options may be necessary until the AI function is stabilized. That is, in case that the functional split option is the seventh functional split 340 option, reconfiguration to an option lower than the seventh functional split 340 option may be necessary. In case that the AI function is stabilized, the functional split option may be restored to its original state.

According to an embodiment, in case that an environmental change occurs in the RU 110, for example, in case that the hardware of the RU 110 is damaged or a problem occurs in the wireless communication environment, there is a risk that the performance of the AI function will deteriorate. Therefore, reconfiguration of functional split options may be necessary. That is, in case that the functional split option is the seventh functional split 340 option, reconfiguration to an option lower than the seventh functional split 340 option may be necessary.

The disclosure assumes that the AI function is applied to the channel encoding/scrambling (or channel decoding/scrambling) process, but the disclosure is not necessarily limited thereto, and the AI function may be applied to any one process of the respective processes of the physical layer such as modulation, layer mapping, antenna mapping, and RE mapping. In this case, in case that a limitation occurs due to hardware or other environmental problems while performing the corresponding function on the RU 110, the functional split option may be reconfigured to a lower option.

According to the above-described embodiments, location-specific characteristics are reflected to the AI function, so the performance of the corresponding AI function may vary depending on an entity on which the AI function is performed. That is, since the DU 120 has relatively superior computing performance compared to the RU 110, such as using a graphics processing unit (GPU) as an accelerator, as functional split option reconfiguration is performed, costs due to unnecessary expansion of the storage space of the RU 110 may be reduced. Also, in case that the AI function is performed on the RU 110, fronthaul traffic generated by transmitting data stored in the RU 110 to the DU 120 may be reduced.

Figure 7:
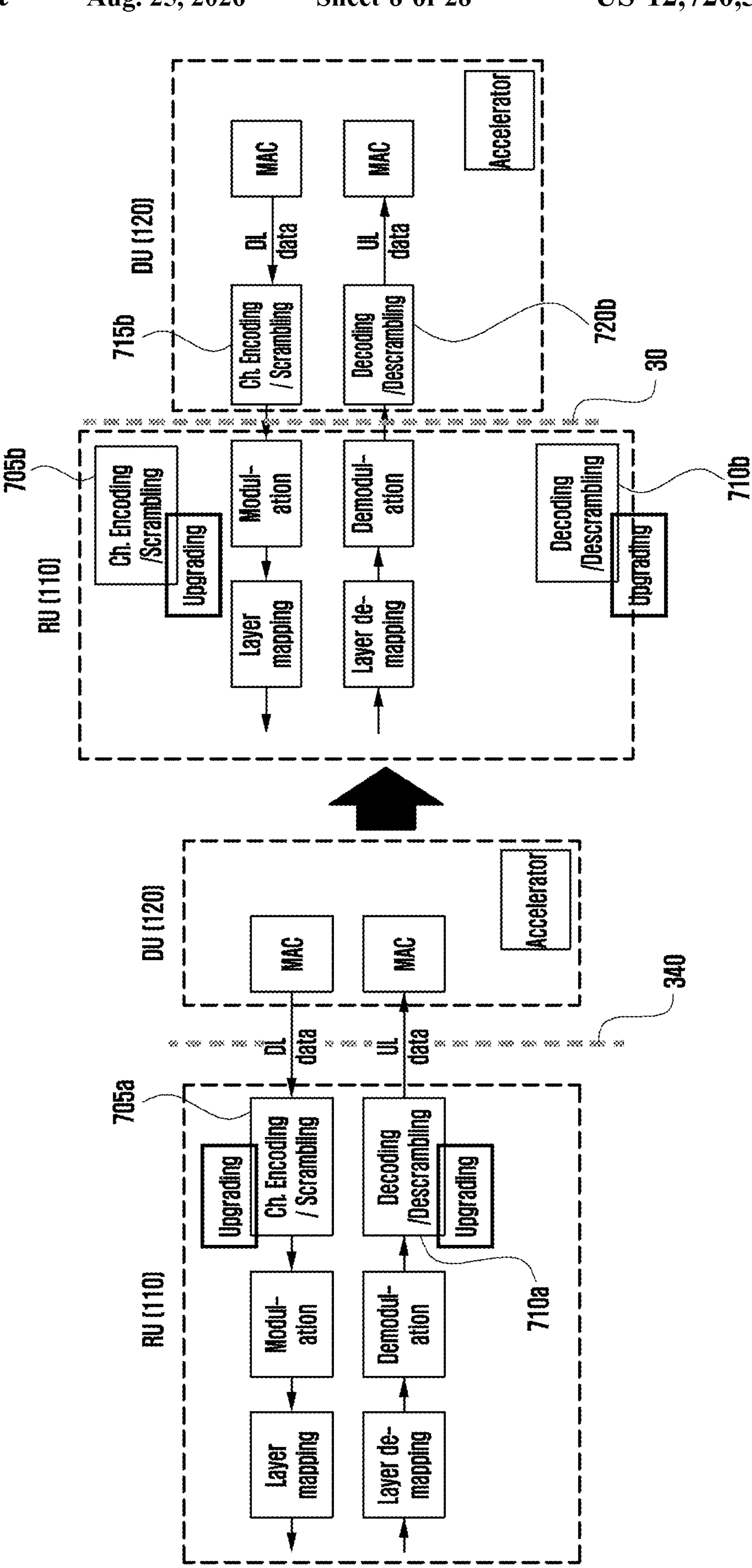
FIG. 7 illustrates a diagram of an embodiment of functional split reconfiguration based on the state of an AI function according to an embodiment of the disclosure.

FIG. 7 illustrates a diagram of an embodiment of functional split reconfiguration based on the state of an AI function according to an embodiment of the disclosure.

With reference to FIG. 7, in case that the AI function is applied to the channel encoding/scrambling (or channel decoding/scrambling) process, the AI function application state of the RU 110 and DU 120 before and after reconfiguring the functional split option is illustrated.

In the case before reconfiguring the functional split option, the seventh functional split 340 option may be applied. That is, in both DL and UL, the RU 110 may perform up to channel encoding/scrambling 705*a* (or channel decoding/scrambling 710*a*), and the DU 120 may be in a state to perform subsequent higher functions.

For example, assuming that the AI model upgrade process is performed on the RU 110 with the seventh functional split 340 option applied, while the corresponding AI model is being upgraded in the RU 110, there may be a case where the AI function may not be performed. For example, in case that the RU 110 is not provided with a memory management unit (MMU) due to hardware constraints, the corresponding AI function may not be performed during the AI model upgrade. To solve this problem, even if the RU 110 is provided with legacy functions in preparation for upgrade, additional hardware limitations may occur as legacy functions are added.

In order to resolve concerns due to the hardware constraints, in case that it is determined that reconfiguration of the functional split option is necessary, reconfiguration of the functional split option may be performed. In case that functional split option reconfiguration is performed, the seventh functional split 340 option may be reconfigured to the sixth functional split 330 option. In this case, the DU 120 may perform channel encoding/scrambling 715*b* (or channel decoding/scrambling 720*b*). In case that the AI function is moved to the DU 120 as the functional split option is reconfigured, the RU 110 may perform an upgrade for the channel encoding/scrambling 705*b* or channel decoding/scrambling 710*b*. Here, the AI model applied to the channel encoding/scrambling 715*b* (or channel decoding/scrambling 720*b*) process of the DU 120 may be a previously upgraded model. Alternatively, the AI model upgrade may proceed at the same time that the AI function for the above process of the DU 120 is performed.

According to an embodiment, in case that an updated AI model is applied to the ACAP included in the RU 110, a case may occur in which the AI function may not be performed while the AI model is being upgraded in the RU 110. In addition, the performance of the RU 110 may decrease due to the inability to apply AI functions during the upgrade time of the AI model and the application time of the upgrade. For example, a reduction in transmission range may occur due to not applying CSI compression and/or CSI prediction. Therefore, reconfiguration of functional split options may be necessary to address these issues. That is, in case that the functional split option is the seventh functional split 340 option, reconfiguration to an option lower than the seventh functional split 340 option may be necessary.

The disclosure assumes that the AI function is applied to the channel encoding/scrambling (or channel decoding/scrambling) process, but the disclosure is not necessarily limited thereto, and the AI function may be applied to any one process of the respective processes of the physical layer such as modulation, layer mapping, antenna mapping, and RE mapping. In this case, in case that the performance of the RU 110 is reduced while the corresponding function is performed on the RU 110, the functional split option may be reconfigured to a lower option.

According to the above-described embodiments, in case that the corresponding AI function is performed on the DU 120 by reconfiguring the functional split option when upgrading the AI model in the RU 110, the AI function may be continuously performed during the AI model upgrade of the RU 110. Therefore, it is possible to prevent performance degradation of the base station and maintain service continuity.

Figure 8:
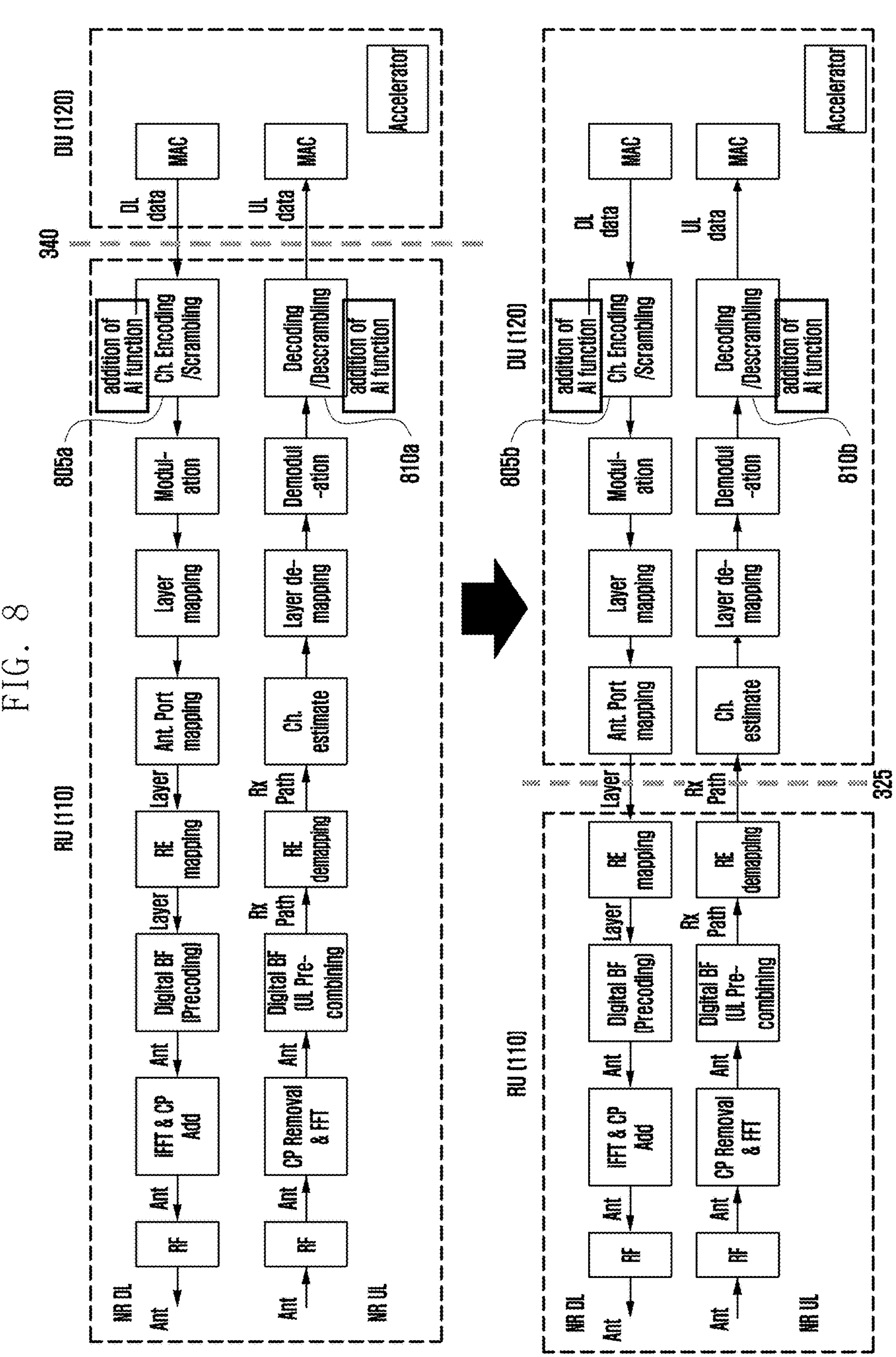
FIG. 8 illustrates a diagram of an embodiment of functional split reconfiguration based on the state of an AI function according to an embodiment of the disclosure.

FIG. 8 illustrates a diagram of an embodiment of functional split reconfiguration based on the state of an AI function according to an embodiment of the disclosure.

With reference to FIG. 8, in case that the AI function is in addition applied to the channel encoding/scrambling (or channel decoding/scrambling) process, the AI function application state of the RU 110 and DU 120 before and after reconfiguring the functional split option is illustrated.

In the case before reconfiguring the functional split option, the seventh functional split 340 option may be applied. That is, the RU 110 performs up to channel encoding/scrambling 805*a* (or channel decoding/scrambling 810*a*) in both DL and UL, and the DU 120 may be in a state to perform subsequent higher functions.

For example, assuming that the AI function is added to the RU 110 with the seventh functional split 340 option applied, there may be a case where additional application of the AI functions is not possible due to hardware limitations of the RU 110.

In order to solve the problem of not being able to further apply the AI function due to the hardware constraints, in case that it is determined that reconfiguration of the functional split option is necessary, reconfiguration of the functional split option may be performed. In case that functional split option reconfiguration is performed, the seventh functional split 340 option may be reconfigured to the fifth functional split 325 option. In this case, the RU 110 may perform up to RE mapping (or RE de-mapping) in both DL and UL, and the DU 120 may perform higher PHY functions after RE mapping (or RE de-mapping). As the functional split option is reconfigured, the DU 120 may add the AI function for channel encoding/scrambling 805*b* or channel decoding/scrambling 810*b*.

The disclosure assumes that the AI function is in addition applied to the channel encoding/scrambling (or channel decoding/scrambling) process, but the disclosure is not necessarily limited thereto. The AI function may be applied to any one process of the respective processes of a physical layer such as modulation, layer mapping, antenna mapping, and RE mapping.

According to the above-described embodiments, in case that there are hardware constraints on adding the AI function in the RU 110, in case that the DU 120 performs additional application of the corresponding AI function by reconfiguring the functional split option, the AI function is in addition applied to the DU 120 without changing the hardware conditions of the RU 110, thereby improving the performance of the base station.

Next, a functional split reconfiguration method according to an embodiment of the disclosure will be described with reference to FIGS. 9A and 9B.

Hereinafter, in describing the method according to this embodiment, description of a subject performing some operations may be omitted. In this case, it may be understood that the subject performing the corresponding operation is the DU 120 or RU 110. In addition, in FIGS. 9A to 9B below, the AI management function may be replaced by the AIMF 211, NF, or OAM 200. Here, in case that the AI management function is NF, the NF may transmit and receive messages through the AMF 170.

Figure 9A:
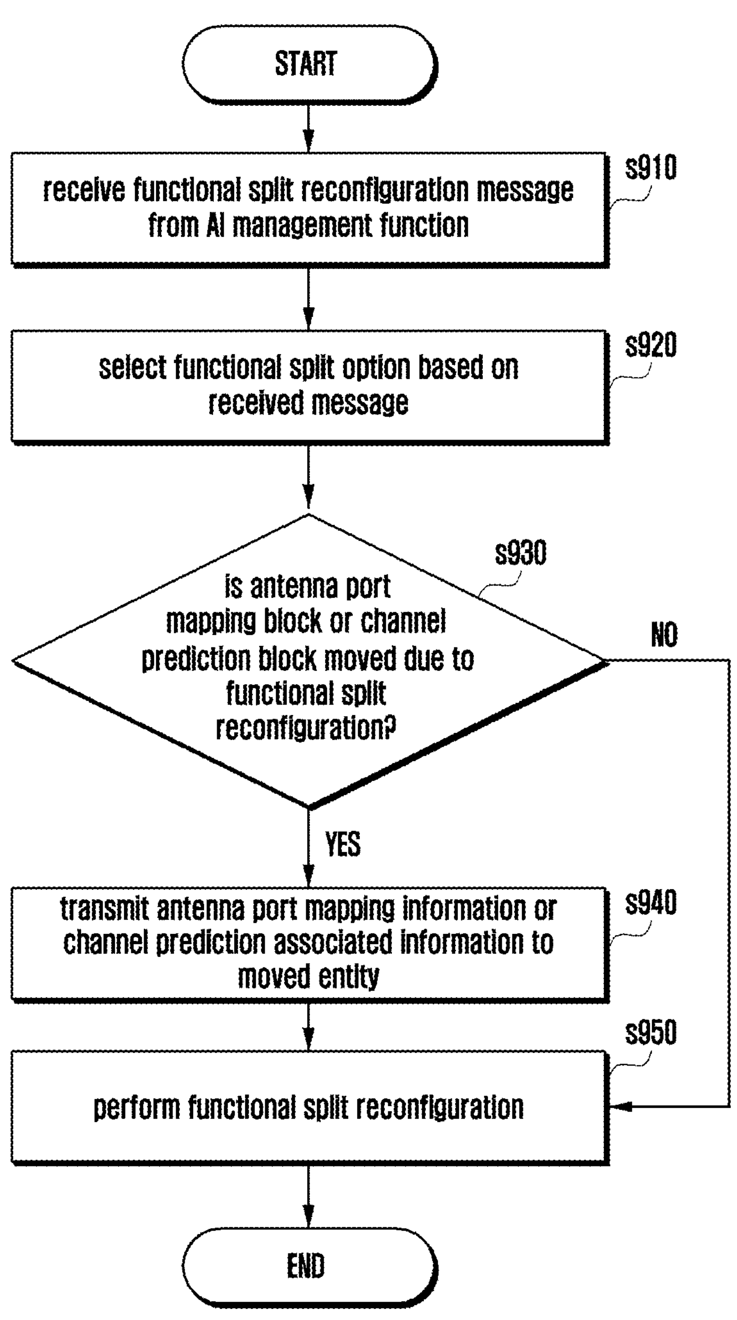
FIG. 9A illustrates a diagram of an embodiment of a functional split reconfiguration method according to an embodiment of the disclosure.

FIG. 9A illustrates a diagram of an embodiment of a functional split reconfiguration operation according to an embodiment of the disclosure.

With reference to FIG. 9A, in operation s910, the DU 120 may receive a functional split reconfiguration message from the AI management function.

Here, the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120 that has received the functional split reconfiguration message from the AI management function may transmit the same functional split reconfiguration message to each RU of the set of a plurality of RUs. That is, the same functional split option may be reconfigured for a set of multiple RUs.

In case that the DU 120 of the disclosure includes a set of DUs, each corresponding to each of a plurality of RUs, it may be a plurality of functional split reconfiguration messages corresponding to a plurality of DUs and RUs transmitted from the AI management function to the DU 120. For example, in case that the seventh functional split 340 option is applied to the first RU and the second RU, the DU 120, which has received the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU, and may transmit, to the second RU, a second functional split reconfiguration message including reconfiguration information to the fifth functional split 325 option corresponding to the second RU.

In operation s920, the DU 120 may receive the functional split reconfiguration message and select a functional split reconfiguration option.

In operation s930, the DU 120 may determine whether an antenna port mapping block or channel prediction block is moved due to the functional split reconfiguration.

In case that the antenna port mapping block or channel prediction block is moved to the DU 120 due to functional split reconfiguration, antenna port mapping information or channel prediction associated information may be transmitted to the DU 120 in operation s940.

For example, assuming that the seventh functional split 340 option is applied to the RU 110 and DU 120, in case that the DU 120 receives, from the AI management function, the functional split reconfiguration message including reconfiguration information to the fourth functional split 320*b* option, in case that the functional split option is reconfigured from the seventh functional split 340 option to the fourth functional split 320*b* option, the DU 120 may determine that it is a case where the antenna port mapping block or channel prediction block is moved and receive the antenna port mapping information or channel prediction associated information from the RU 110.

In case that the antenna port mapping block or channel prediction block is not moved due to functional split reconfiguration, or in case that the antenna port mapping information or channel prediction associated information is transmitted to the DU 120 in operation s940, functional split reconfiguration may be performed in operation s950.

FIG. 9B illustrates a diagram for explaining the functional split reconfiguration method described in FIG. 9A.

With reference to FIG. 9B, in case that slot-unit operation blocks 915*b* and 920*b* are moved between the RU 110 and the DU 120 in PHY, information about the block before the block is moved may be not required by an entity to which the block has been moved. However, in case that an antenna port mapping block 905*b* or channel prediction block 910*b* is moved between the RU 110 and the DU 120, channel information before the move may be required by the entity to which the block has been moved. Since channel information is measured in a unit of milliseconds, when changing the functional split option, in case that the entity to which the corresponding block has been moved does not have the channel information, the entire operation of the PHY function may become impossible. Here, the unit of measurement of channel information may be, for example, a unit of 100 milliseconds.

Therefore, as described in FIG. 9A, the DU 120 determines whether the antenna port mapping block or channel prediction block is moved due to the functional split reconfiguration, and in case that the antenna port mapping block or channel estimation block is moved, the DU 120 may request the channel information from the RU 110. In case that the corresponding channel information is transmitted from the RU 110 to the DU 120, the channel information is transmitted to the entity to which the corresponding block has been moved (DU 120), thereby enabling the entire operation of the PHY function.

Next, the functional split process by the OAM 200, RU 110, and DU 120 according to an embodiment of the disclosure will be described with reference to FIGS. 10A to 10D. Here, the OAM 200 may include the function of the AIMF 201.

Figure 10A:
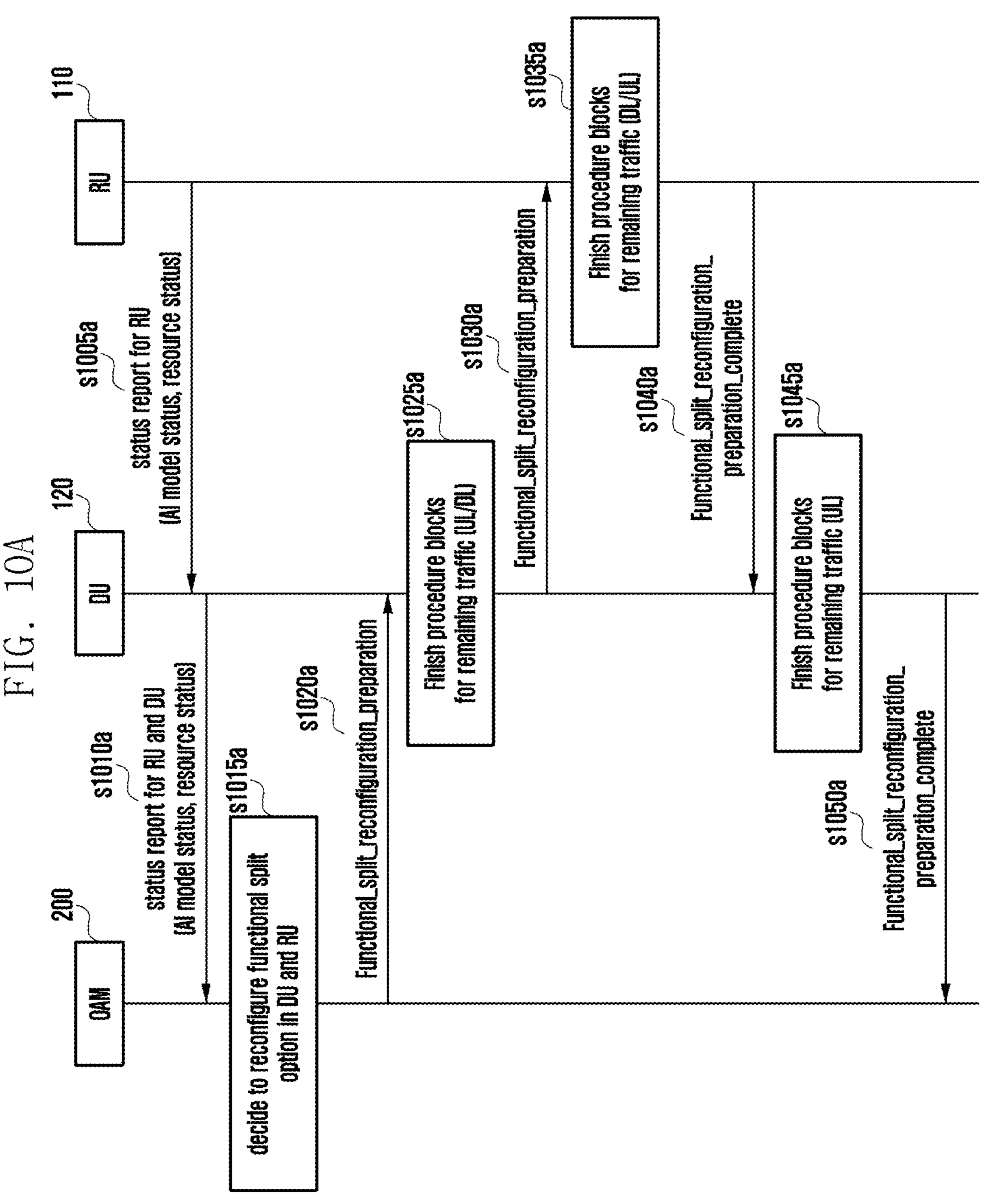
FIG. 10A illustrates a signal flow diagram of a functional split preparation process by OAM, radio unit (RU), and digital unit (DU) according to an embodiment of the disclosure.

FIG. 10A illustrates is a signal flow diagram of a functional split preparation process by the OAM 200, RU 110, and DU 120 according to an embodiment of the disclosure.

With reference to FIG. 10A, in operation s1005*a*, the RU 110 may transmit a state report of the RU 110 to the DU 120.

Here, the state report of the RU 110 may include information about at least one of the followings:

- AI function state of the RU 110,
- resource state of the RU 110,
- other hardware constraints of the RU 110, or
- wireless communication environment of the RU 110
- in addition to the above-mentioned matters, various matters that may be considered when applying the AI functions to the RU 110.

In operation s1010*a*, the DU 120 may transmit state reports of the RU 110 and DU 120 to the OAM 200.

Here, the state reports of the RU 110 and DU 120 may include information about at least one of the followings:

- information included in the state report of the RU 110,
- AI function state of the DU 120,
- resource state of the DU 120,
- other hardware constraints of the DU 120,
- wireless communication environment of the DU 120, or
- in addition to the above-mentioned matters, various matters that may be considered when applying the AI functions to the RU 110 and DU 120

In operation s1015*a*, the OAM 200 may determine whether the functional split reconfiguration is performed based on the state reports of the RU 110 and DU 120 received from the DU 120.

For example, the OAM 200 may consider hardware constraints of the RU 110 and DU 120, resource state, wireless communication environment, other environmental constraints, or AI function state, based on the state reports of the RU 110 and DU 120, and in addition to the above-mentioned matters, additionally consider various matters that may be considered when applying the AI function to the RU 110 and DU 120 to determine whether it is necessary to perform functional split.

According to an embodiment, the OAM 200 may determine that functional split is necessary for the embodiments described in FIGS. 6 to 8.

In operation s1020*a*, in case that it is determined by the OAM 200 that functional split reconfiguration is necessary, the OAM 200 may transmit a functional split reconfiguration preparation message to the DU 120.

In operation s1025*a*, the DU 120 may complete transmission of the already transmitting traffic (UL/DL) of the block corresponding to the PHY function process based on the functional split reconfiguration preparation message.

In operation s1030*a*, the DU 120 may transmit a functional split reconfiguration preparation message to the RU 110. Here, the functional split reconfiguration preparation message may be a message received from the OAM 200.

Here, the functional split reconfiguration preparation message may be as follows.

- In case that the RU 110 refers to a set of a plurality of RUs located at different locations, it may be a functional split reconfiguration preparation message that is equally transmitted from one DU 120, respectively, for a set of a plurality of RUs connected to the DU 120. For example, the DU 120, which has received the functional split reconfiguration preparation message from the OAM 200, may transmit the same functional split reconfiguration preparation message to each RU of the set of a plurality of RUs.

In case that the DU 120 of the disclosure includes a set of DUs each corresponding to each of a plurality of RUs, it may be a plurality of functional split reconfiguration preparation messages each corresponding to each of the plurality of DUs transmitted from the OAM 200 to the DU 120. For example, the DU 120, which has received the functional split reconfiguration preparation message including functional split reconfiguration information corresponding to each of a plurality of RUs from the OAM 200, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1035*a*, the RU 110 may complete transmission of the already transmitting traffic (DL/UL) of the block corresponding to the PHY function process based on the functional split reconfiguration preparation message.

In operation s1040*a*, the RU 110 may transmit a functional split reconfiguration preparation complete message to the DU 120.

In operation s1045*a*, the DU 120 may complete transmission of the already transmitting traffic (UL) of the block corresponding to the PHY function process based on the functional split reconfiguration preparation message.

In operation s1050*a*, the DU 120 may transmit the functional split reconfiguration preparation complete message to the OAM 200.

The OAM 200 may receive the functional split reconfiguration preparation complete message from the DU 120 and identify that the functional split reconfiguration of the RU 110 and DU 120 has been prepared.

Figure 10B:
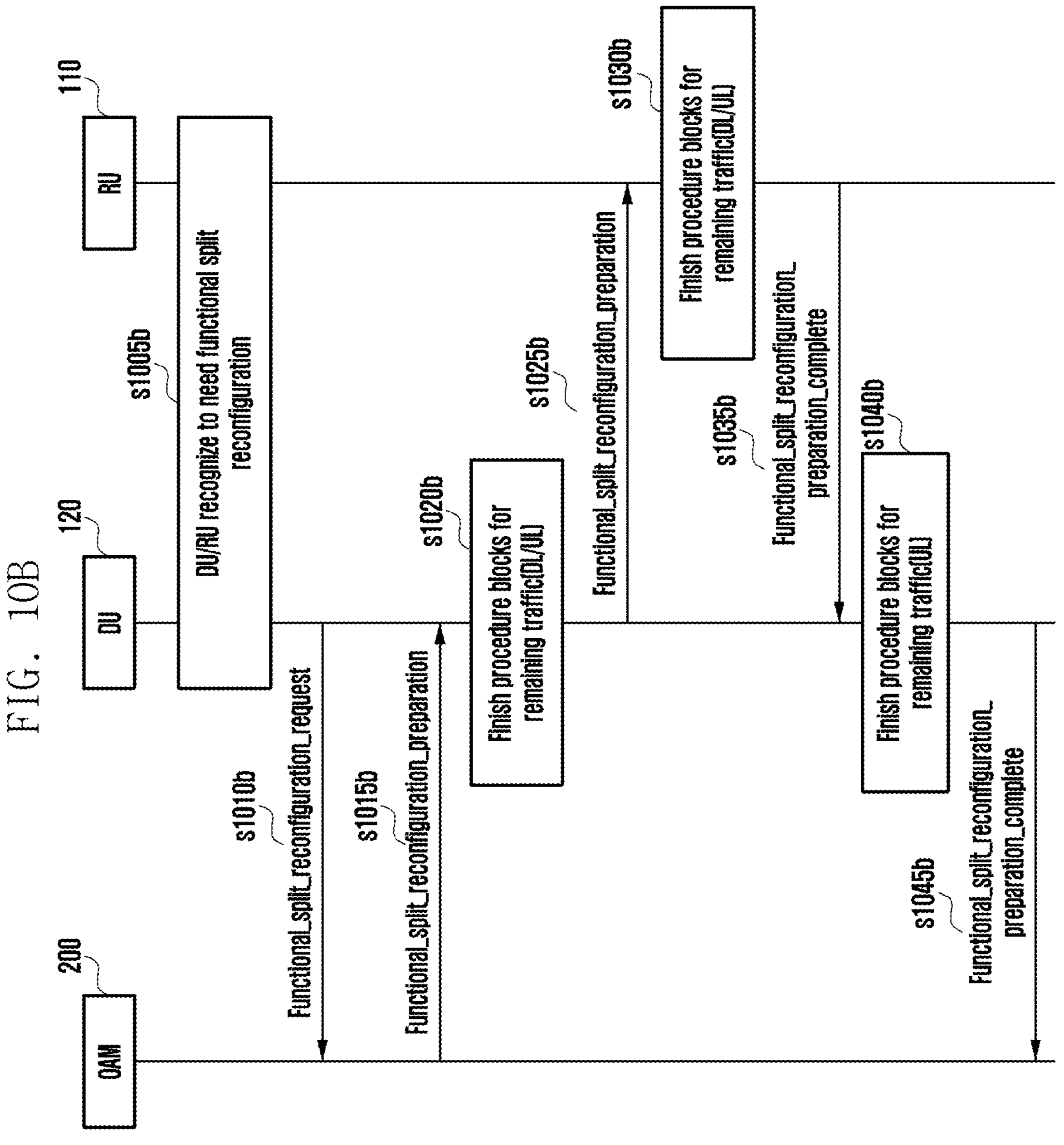
FIG. 10B illustrates a signal flow diagram of a functional split preparation process by OAM, RU, and DU according to an embodiment of the disclosure.

FIG. 10B illustrates a signal flow diagram of a functional split preparation process by the OAM 200, RU 110, and DU 120 according to an embodiment of the disclosure.

With reference to FIG. 10B, in operation s1005*b*, the RU 110 and DU 120 may determine whether functional split reconfiguration is necessary based on the information about the state of the RU 110 and the information about the state of the DU 120.

According to an embodiment, the DU 120 receives the information about the state of the RU 110 from the RU 110, and may consider hardware constraints of the RU 110 and DU 120, resource state, wireless communication environment, other environmental constraints, or AI function state, and in addition to the above-mentioned matters, additionally consider various matters that may be considered when applying the AI function to the RU 110 and DU 120 to determine whether it is necessary to perform functional split.

According to an embodiment, the RU 110 and/or DU 120 may determine that functional split is necessary for the embodiments described in FIGS. 6 to 8. For example, the DU 120 may receive the information about the state of the RU 110 from the RU 110 and determine whether functional split is necessary.

In operation s1010*b*, the DU 120 may transmit a functional split reconfiguration request message to the OAM 200.

In operation s1015*b*, the OAM 200 may transmit a functional split reconfiguration preparation message to the DU 120.

In operation s1020*b*, the DU 120 may complete transmission of the already transmitting traffic (UL/DL) of the block corresponding to the PHY function process based on the functional split reconfiguration preparation message.

In operation s1025*b*, the DU 120 may transmit a functional split reconfiguration preparation message to the RU 110. Here, the functional split reconfiguration preparation message may be a message received from the OAM 200.

Here, the functional split reconfiguration preparation message may be as follows.

In case that the RU 110 refers to a set of a plurality of RUs located at different points, it may be a functional split reconfiguration preparation message that is equally transmitted from one DU 120, respectively, for a set of a plurality of RUs connected to the DU 120. For example, the DU 120, which has received the functional split reconfiguration preparation message from the OAM 200, may transmit the same functional split reconfiguration preparation message to each RU of the set of a plurality of RUs.

In case that the DU 120 of the disclosure includes a set of DUs each corresponding to each of a plurality of RUs, it may be a plurality of functional split reconfiguration preparation messages each corresponding to each of the plurality of DUs transmitted from the OAM 200 to the DU 120. For example, the DU 120, which has received the functional split reconfiguration preparation message including functional split reconfiguration information corresponding to each of a plurality of RUs from the OAM 200, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1030*b*, the RU 110 may complete transmission of the already transmitting traffic (DL/UL) of the block corresponding to the PHY function process based on the functional split reconfiguration preparation message.

In operation s1035*b*, the RU 110 may transmit a functional split reconfiguration preparation complete message to the DU 120.

In operation s1040*b*, the DU 120 may complete transmission of the already transmitting traffic (UL) of the block corresponding to the PHY function process based on the functional split reconfiguration preparation message.

In operation s1045*b*, the DU 120 may transmit the functional split reconfiguration preparation complete message to the OAM 200.

The OAM 200 may receive the functional split reconfiguration preparation complete message from the DU 120 and identify that the functional split reconfiguration of the RU 110 and DU 120 has been prepared.

Figure 10C:
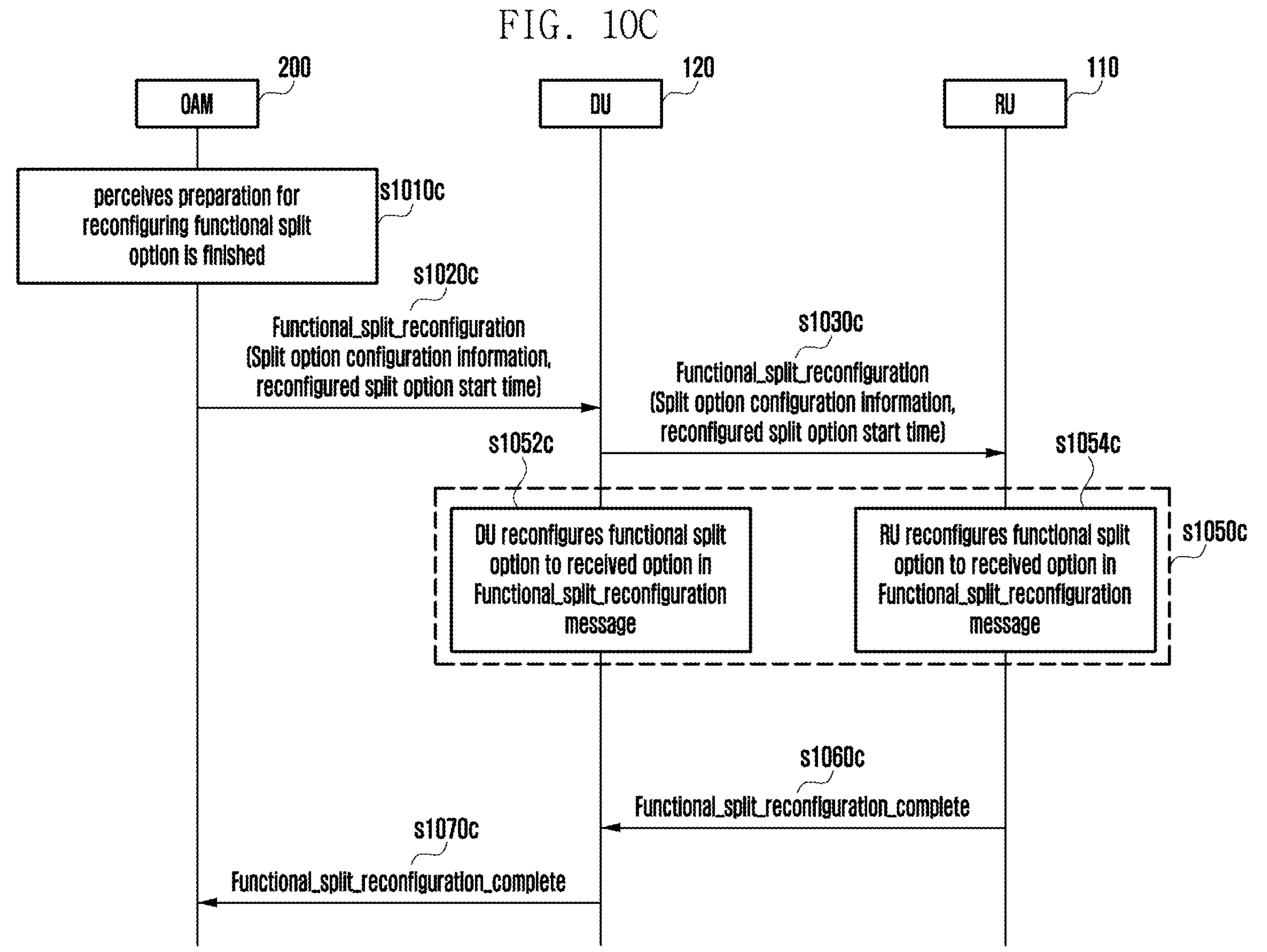
FIG. 10C illustrates a signal flow diagram of a functional split performing process by OAM, RU, and DU according to an embodiment of the disclosure.

FIG. 10C illustrates a signal flow diagram of a functional split process by the OAM 200, RU 110, and DU 120 according to an embodiment of the disclosure.

With reference to FIG. 10C, in operation s1010*c*, the OAM 200 may identify that preparations for functional split of the RU 110 and DU 120 are complete. For example, in case that the OAM 200 receives the functional split preparation complete message from the DU 120, it may determine that the preparation for functional split of the RU 110 and DU 120 has been completed.

In operation s1020*c*, the OAM 200 may transmit a functional split reconfiguration message to the DU 120.

Here, the functional split reconfiguration message may include at least one of the followings:

reconfiguration information for functional split option, or functional split option reconfiguration start time information In operation s1030*c*, the DU 120 may transmit the functional split reconfiguration message to the RU 110. Here, the functional split reconfiguration message may be a message received by the DU 120 from the OAM 200.

In addition, here the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the AIMF 211, may transmit the same functional split reconfiguration message to each RU of the set of a plurality of RUs. That is, the same functional split option may be reconfigured for a set of a plurality of RUs, and the start time of the same functional split option reconfiguration may be configured.

In case that the DU 120 of the disclosure includes a set of DUs each corresponding to each of a plurality of RUs, it may be a plurality of functional split reconfiguration messages corresponding to a plurality of DUs and RUs transmitted from the AIMF 211 to the DU 120. For example, in case that the seventh functional split 340 option is applied to the first RU and the second RU, the DU 120, which has received the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1050*c*, the RU 110 and DU 120 may reconfigure functional split option based on the information included in the functional split reconfiguration message.

According to an embodiment, in operation s1052*c*, the DU 120 may reconfigure functional split option based on the information included in the functional split reconfiguration message, and in operation s1054*c*, the RU 110 may reconfigure functional split option based on the information included in the functional split reconfiguration message. Here, reconfiguration of the functional split options of the RU 110 and DU 120 may be performed simultaneously or sequentially.

In operation s1060*c*, the RU 110 may transmit a functional split reconfiguration complete message of the RU 110 to the DU 120.

In operation s1070*c*, the DU 120 may transmit the functional split reconfiguration complete message of the RU 110 and DU 120 to the OAM 200.

In case that the OAM 200 receives the functional split reconfiguration complete message from the DU 120, it may identify that the functional split reconfiguration of the RU 110 and DU 120 has been completed.

FIG. 10D illustrates a signal flow diagram of a functional split process by the OAM 200, RU 110, and DU 120, including a channel information transmission process, according to an embodiment of the disclosure.

With reference to FIG. 10D, in operation s101*d*, the OAM 200 may identify that preparation for functional split of the RU 110 and DU 120 has been completed. For example, in case that the OAM 200 receives a functional split preparation complete message from the DU 120, it may determine that the preparation for functional split of the RU 110 and DU 120 has been completed.

In operation s1020*d*, the OAM 200 may transmit a functional split reconfiguration message to the DU 120.

Here, the functional split reconfiguration message may include at least one of the followings:

reconfiguration information for functional split option, or functional split option reconfiguration start time information In operation s1030*d*, the DU 120 may transmit a functional split reconfiguration message to the RU 110. Here, the functional split reconfiguration message may be a message received by the DU 120 from the OAM 200.

In addition, here the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the AIMF 211, may transmit the same functional split reconfiguration message to each RU of the set of a plurality of RUs. That is, the same functional split option may be reconfigured for a set of a plurality of RUs, and the start time of the same functional split option reconfiguration may be configured.

In case that the DU 120 of the disclosure includes a set of DUs, each corresponding to each of a plurality of RUs, it may be a plurality of functional split reconfiguration messages corresponding to a plurality of DUs and RUs transmitted from the AIMF 211 to the DU 120. For example, in case that the seventh functional split 340 option is applied to the first RU and the second RU, the DU 120, which has received the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1040*d*, channel information (antenna port mapping information or channel prediction associated information) may be transmitted from the RU 110 to the DU 120.

According to an embodiment, in case that the DU 120 determines that the antenna port mapping block or channel prediction block is moved due to the functional split reconfiguration, the DU 120 may receive antenna port mapping information or channel prediction associated information from the RU 110.

For example, assuming that the seventh functional split 340 option is applied to the RU 110 and DU 120, in case that the DU 120 receives the functional split reconfiguration message including reconfiguration information to the fourth functional split 320*b* option from the OAM 200, in case that the functional split option is reorganized from the seventh functional split 340 option to the fourth functional split 320*b* option, the DU 120 may determine that it is a case where the antenna port mapping block or channel prediction block is moved, and receive the antenna port mapping information or channel prediction association information from the RU 110.

In operation s1050*d*, the RU 110 and DU 120 may reconfigure functional split option based on the information included in the functional split reconfiguration message.

According to an embodiment, in operation s1052*d*, the DU 120 may reconfigure functional split option based on the information included in the functional split reconfiguration message, and in operation s1054*d*, the RU 110 may reconfigure the functional split option based on the information included in the functional split reconfiguration message. Here, reconfiguration of the functional split options of the RU 110 and DU 120 may be performed simultaneously or sequentially.

In operation s1060*d*, the RU 110 may transmit a functional split reconfiguration complete message of the RU 110 to the DU 120.

In operation s1070*d*, the DU 120 may transmit the functional split reconfiguration complete message of the RU 110 and DU 120 to the OAM 200.

In case that the OAM 200 receives the functional split reconfiguration complete message from the DU 120, it may identify that the functional split reconfiguration of the RU 110 and DU 120 has been completed.

Next, the functional split process by the AIMF 211, RU 110, and DU 120 according to an embodiment of the disclosure will be described with reference to FIGS. 11A to 11D. Here, the AIMF 211 is not limited to the AI plane 210 and may be implemented in CP or MP. Furthermore, the AIMF 211 may be distributed and deployed in respective NFs.

Figure 11A:
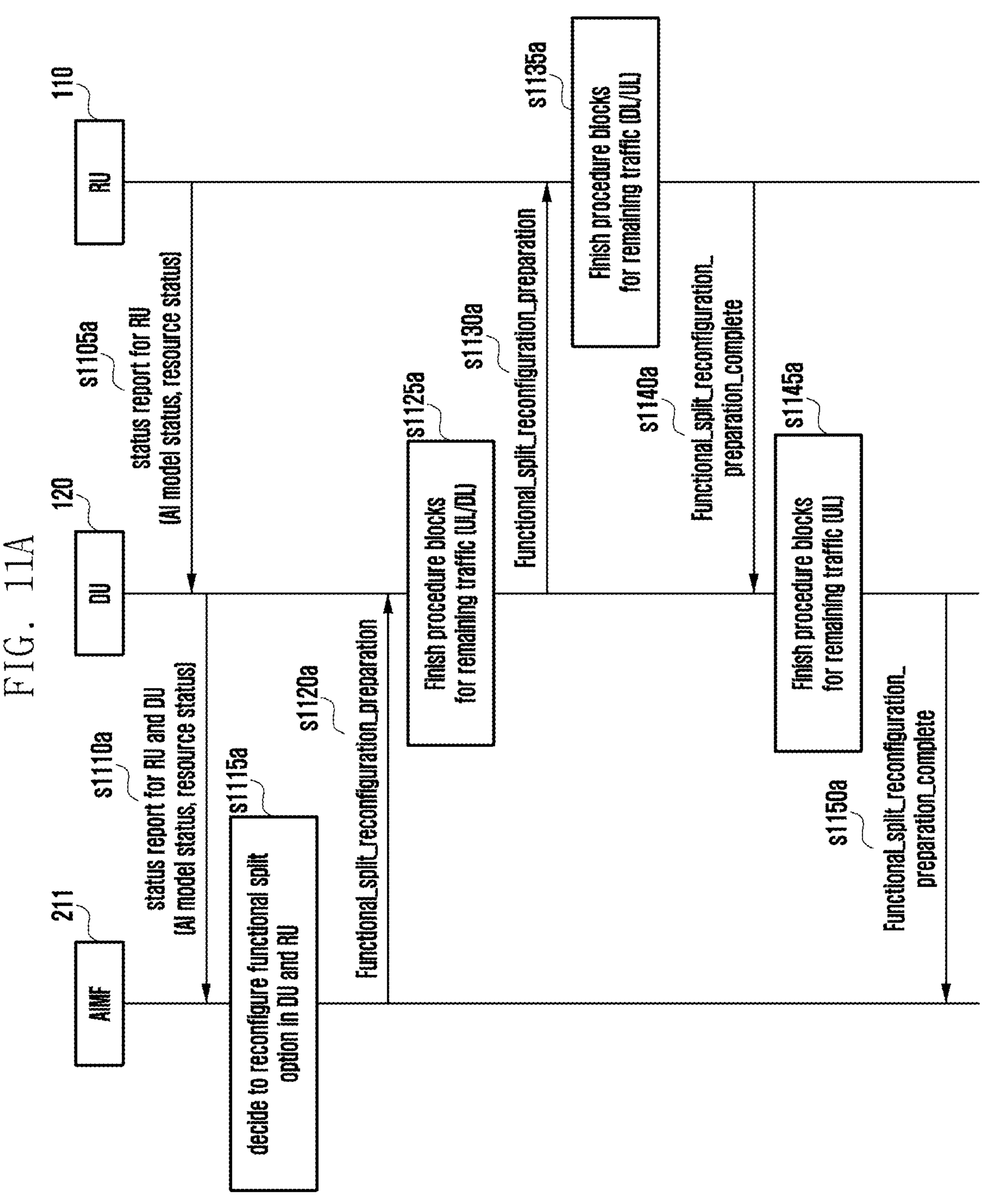
FIG. 11A illustrates a signal flow diagram of a functional split preparation process by artificial intelligence management function (AIMF), RU, and DU according to an embodiment of the disclosure.

FIG. 11A illustrates a signal flow diagram of a functional split preparation process by the AIMF 211, RU 110, and DU 120 according to an embodiment of the disclosure.

With reference to FIG. 11A, In operation s1105*a*, the RU 110 may transmit a state report of the RU 110 to the DU 120.

Here, the state report of the RU 110 may include information about the at least one of the followings:

AI function state of the RU 110, resource state of the RU 110, other hardware constraints of the RU 110, or wireless communication environment of the RU 110 in addition to the above-mentioned matters, various matters that may be considered when applying AI function to the RU 110.

In operation s1110*a*, the DU 120 may transmit the state reports of the RU 110 and DU 120 to the AIMF 211.

Here, the state reports of the RU 110 and DU 120 may include information about at least one of the followings:

information included in the state report of the RU 110,

AI function state of the DU 120, resource state of the DU 120, other hardware constraints of the DU 120, wireless communication environment of the DU 120, or in addition to the above-mentioned matters, various matters that may be considered when applying AI function to the RU 110 and DU 120

In operation s1115*a*, the AIMF 211 may determine whether functional split is reconfigured based on the state reports of the RU 110 and DU 120 received from the DU 120.

For example, the AIMF 211 may consider hardware constraints of the RU 110 and DU 120, resource state, wireless communication environment, other environmental constraints, or AI function state, based on the state reports of the RU 110 and DU 120, and in addition to the above-mentioned matters, additionally consider various matters that may be considered when applying the AI function to the RU 110 and DU 120 to determine whether it is necessary to perform functional split.

According to an embodiment, the AIMF 211 may determine that functional split is necessary for the embodiments described in FIGS. 6 to 8.

In operation s1120*a*, in case that the AIMF 211 determines that functional split reconfiguration is necessary, the AIMF 211 may transmit a functional split reconfiguration preparation message to the DU 120.

In operation s1125*a*, the DU 120 may complete transmission of the already transmitting traffic (UL/DL) of the block corresponding to the PHY function process based on the functional split reconfiguration preparation message.

In operation s1130*a*, the DU 120 may transmit the functional split reconfiguration preparation message to the RU 110. Here, the functional split reconfiguration preparation message may be a message received from the AIMF 211.

Here, the functional split reconfiguration preparation message may be as follows.

In case that the RU 110 refers to a set of a plurality of RUs located at different locations, it may be a functional split reconfiguration preparation message that is equally transmitted from one DU 120, respectively, for a set of a plurality of RUs connected to the DU 120. For example, the DU 120, which has received the functional split reconfiguration preparation message from the AIMF 211, may transmit the same functional split reconfiguration preparation message to each RU of the set of a plurality of RUs.

In case that the DU 120 of the disclosure includes a set of DUs each corresponding to each of a plurality of RUs, it may be a plurality of functional split reconfiguration preparation messages each corresponding to each of the plurality of DUs transmitted from the AIMF 211 to the DU 120. For example, the DU 120, which has received the functional split reconfiguration preparation message including functional split reconfiguration information corresponding to each of a plurality of RUs from the AIMF 211, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1135*a*, the RU 110 may complete transmission of the already transmitting traffic (DL/UL) of the block corresponding to the PHY function process based on the functional split reconfiguration preparation message.

In operation s1140*a*, the RU 110 may transmit a functional split reconfiguration preparation complete message to the DU 120.

In operation s1145*a*, the DU 120 may complete transmission of the already transmitting traffic (UL) of the block corresponding to the PHY function process based on the functional split reconfiguration preparation message.

In operation s1150*a*, the DU 120 may transmit the functional split reconfiguration preparation complete message to the AIMF 211.

The AIMF 211 may receive the functional split reconfiguration preparation complete message from the DU 120 and identify that the functional split reconfiguration of the RU 110 and DU 120 has been prepared.

FIG. 11B illustrates a signal flow diagram of a functional split preparation process by the AIMF 211, RU 110, and DU 120 according to an embodiment of the disclosure.

With reference to FIG. 11B, in operation s1105*b*, the RU 110 and DU 120 may determine whether functional split reconfiguration is necessary based on the information about the state of the RU 110 and the information about the state of the DU 120.

According to an embodiment, the DU 120 may receive the information about the state of the RU 110 from the RU 110, and may consider hardware constraints of the RU 110 and DU 120, resource state, wireless communication environment, other environmental constraints, or AI function state, and in addition to the above-mentioned matters, additionally consider various matters that may be considered when applying the AI function to the RU 110 and DU 120 to determine whether it is necessary to perform functional split.

According to an embodiment, the RU 110 and/or DU 120 may determine that functional split is necessary for the embodiments described in FIGS. 6 to 8. For example, the DU 120 may receive the information about the state of the RU 110 from the RU 110, and determine whether functional split is necessary.

In operation s1110*b*, the DU 120 may transmit a functional split reconfiguration request message to the AIMF 211.

In operation s1115*b*, the AIMF 211 may transmit a functional split reconfiguration preparation message to the DU 120.

In operation s1120*b*, the DU 120 may complete transmission of the already transmitting traffic (UL/DL) of the block corresponding to the PHY function process based on the functional split reconfiguration preparation message.

In operation s1125*b*, the DU 120 may transmit the functional split reconfiguration preparation message to the RU 110. Here, the functional split reconfiguration preparation message may be a message received from the AIMF 211.

Here, the functional split reconfiguration preparation message may be as follows.

In case that the RU 110 refers to a set of a plurality of RUs located at different points, it may be a functional split reconfiguration preparation message that is equally transmitted from one DU 120, respectively, for a set of a plurality of RUs connected to the DU 120. For example, the DU 120, which has received the functional split reconfiguration preparation message from the AIMF 211, may transmit the same functional split reconfiguration preparation message to each RU of the set of a plurality of RUs.

In case that the DU 120 of the disclosure includes a set of DUs each corresponding to each of a plurality of RUs, it may be a plurality of functional split reconfiguration preparation messages each corresponding to each of the plurality of DUs transmitted from the AIMF 211 to the DU 120. For example, the DU 120, which has received the functional split reconfiguration preparation message including functional split reconfiguration information corresponding to each of a plurality of RUs from the AIMF 211, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1130*b*, the RU 110 may complete transmission of the already transmitting traffic (DL/UL) of the block corresponding to the PHY function process based on the functional split reconfiguration preparation message.

In operation s1135*b*, the RU 110 may transmit a functional split reconfiguration preparation complete message to the DU 120.

In operation s1140*b*, the DU 120 may complete transmission of the already transmitting traffic (UL) of the block corresponding to the PHY function process based on the functional split reconfiguration preparation message.

In operation s1145*b*, the DU 120 may transmit the functional split reconfiguration preparation complete message to the AIMF 211.

The AIMF 211 may receive the functional split reconfiguration preparation complete message from the DU 120 and identify that the functional split reconfiguration of the RU 110 and DU 120 has been prepared.

Figure 11C:
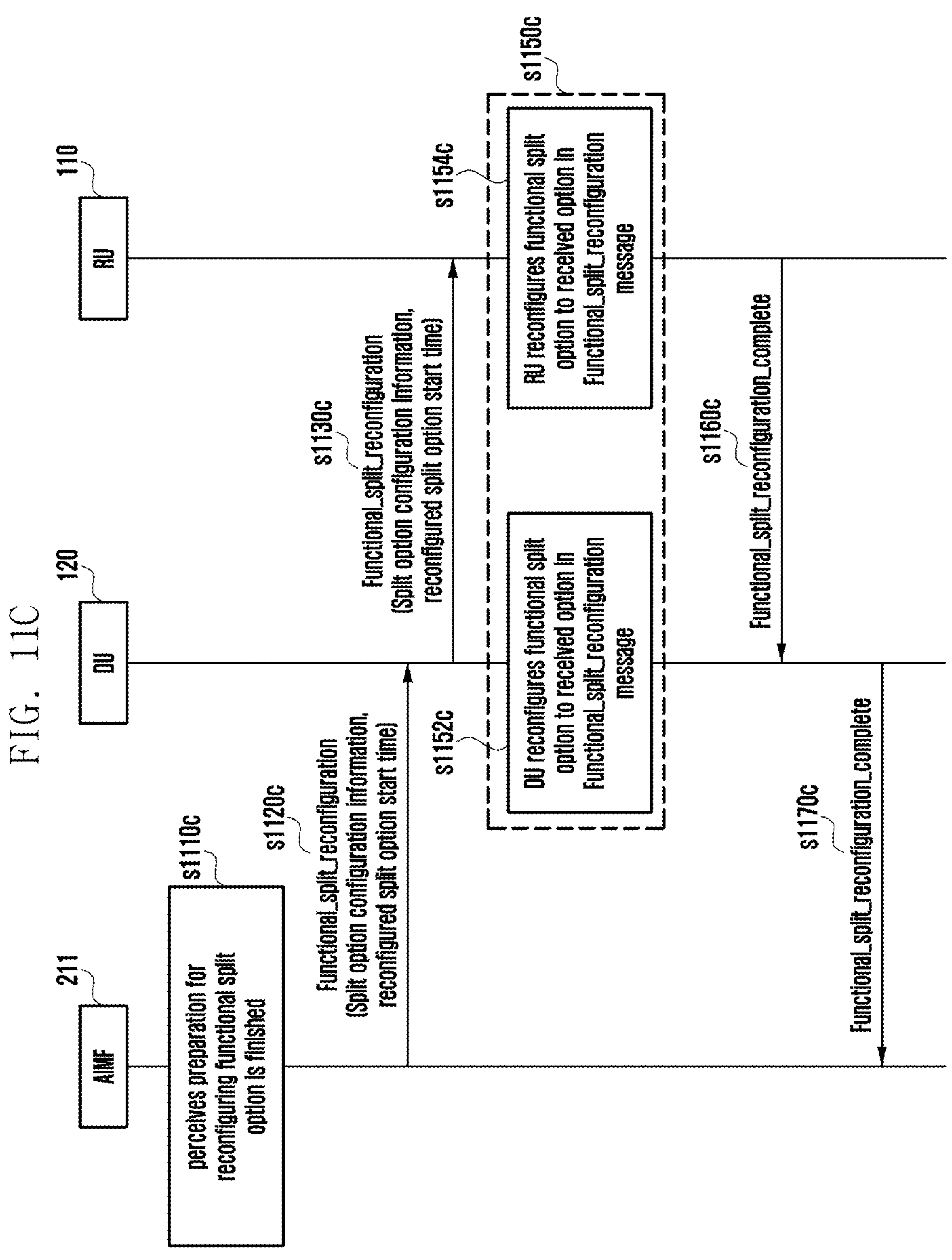
FIG. 11C illustrates a signal flow diagram of a functional split performing process by AIMF, RU, and DU according to an embodiment of the disclosure.

FIG. 11C illustrates a signal flow diagram of a functional split process by the AIMF 211, RU 110, and DU 120 according to an embodiment of the disclosure.

With reference to FIG. 11C, in operation s1110*c*, the AIMF 211 may identify that preparation for functional split of the RU 110 and DU 120 has been completed. For example, in case that the AIMF 211 receives a functional split preparation complete message from DU 120, it may determine that preparation for functional split of RU 110 and DU 120 has been completed.

In operation s1120*c*, the AIMF 211 may transmit a functional split reconfiguration message to the DU 120.

Here, the functional split reconfiguration message may include at least one of the followings:

reconfiguration information for functional split option, or functional split option reconfiguration start time information In operation s1130*c*, the DU 120 may transmit the functional split reconfiguration message to the RU 110. Here, the functional split reconfiguration message may be a message received by the DU 120 from the AIMF 211.

In addition, here the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the AIMF 211, may transmit the same functional split reconfiguration message to each RU of the set of a plurality of RUs. That is, the same functional split option may be reconfigured for a set of a plurality of RUs, and the start time of the same functional split option reconfiguration may be configured.

In case that the DU 120 of the disclosure includes a set of DUs each corresponding to each of a plurality of RUs, it may be a plurality of functional split reconfiguration messages corresponding to a plurality of DUs and RUs transmitted from the AIMF 211 to the DU 120. For example, in case that the seventh functional split 340 option is applied to the first RU and the second RU, the DU 120, which has received the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1150*c*, the RU 110 and DU 120 may reconfigure functional split option based on the information included in the functional split reconfiguration message.

According to an embodiment, in operation s1152*c*, the DU 120 may reconfigure functional split option based on the information included in the functional split reconfiguration message, and in operation s1154*c*, the RU 110 may reconfigure the functional split option based on the information included in the functional split reconfiguration message. Here, reconfiguration of the functional split option of the RU 110 and DU 120 may be performed simultaneously or sequentially.

In operation s1160*c*, the RU 110 may transmit a functional split reconfiguration complete message of the RU 110 to the DU 120.

In operation s1170*c*, the DU 120 may transmit the functional split reconfiguration complete message of the RU 110 and DU 120 to the AIMF 211.

In case that the AIMF 211 receives the functional split reconfiguration complete message from the DU 120, it may identify that the functional split reconfiguration of the RU 110 and DU 120 has been completed.

Figure 11D:
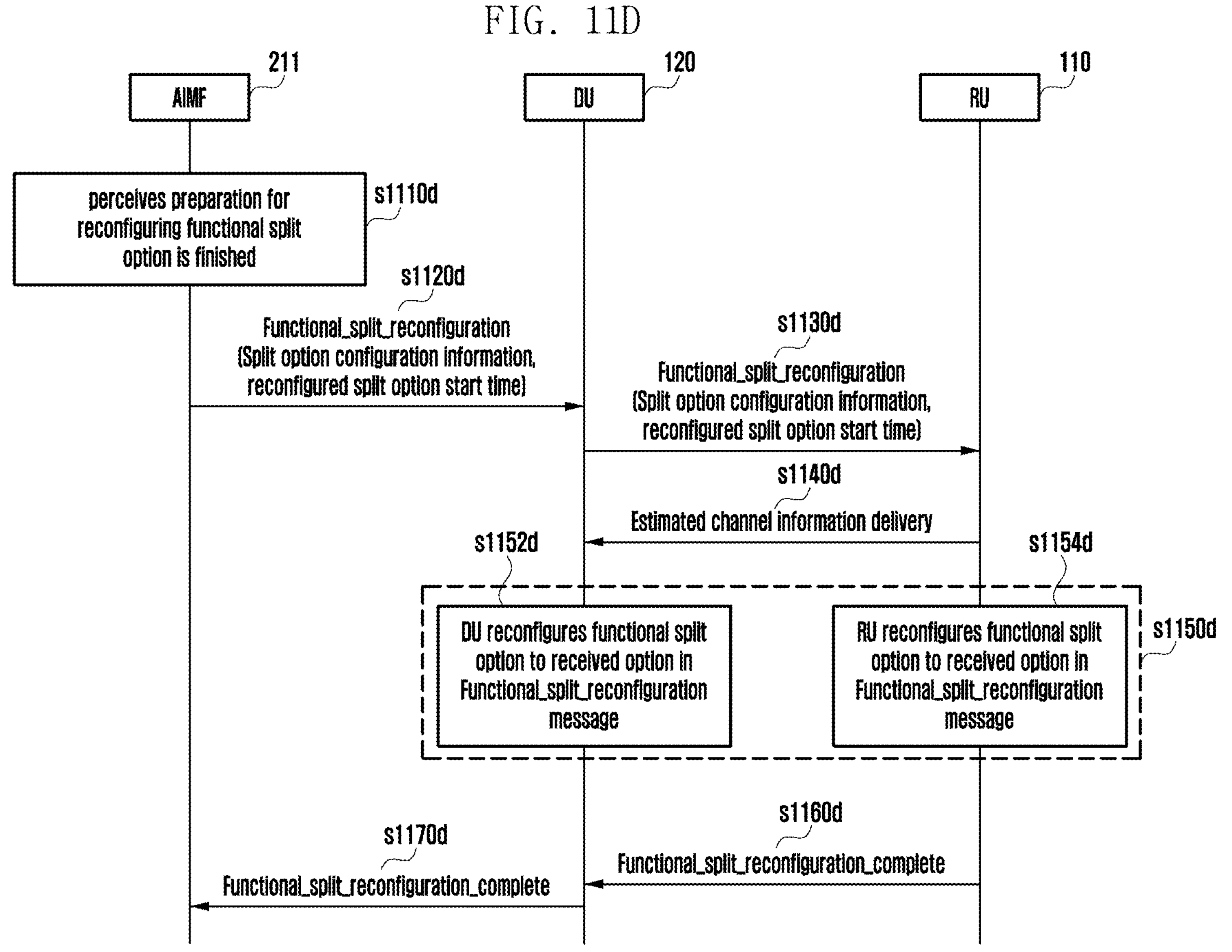
FIG. 11D illustrates a signal flow diagram of a functional split performing process by AIMF, RU, and DU including a channel information transmission process according to an embodiment of the disclosure.

FIG. 11D illustrates a signal flow diagram of a functional split process by the AIMF 211, RU 110, and DU 120, including a channel information transmission process, according to an embodiment of the disclosure.

With reference to FIG. 11D, in operation s1110*d*, the AIMF 211 may identify that preparation for functional split of the RU 110 and DU 120 has been completed. For example, in case that the AIMF 211 receives the functional split preparation complete message from DU 120, it may determine that preparation for functional split of RU 110 and DU 120 has been completed.

In operation s1120*d*, the AIMF 211 may transmit a functional split reconfiguration message to the DU 120.

Here, the functional split reconfiguration message may include at least one of the followings:

reconfiguration information for functional split option, or functional split option reconfiguration start time information In operation s1130*d*, the DU 120 may transmit the functional split reconfiguration message to the RU 110. Here, the functional split reconfiguration message may be a message received by the DU 120 from the AIMF 211.

In addition, here the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the AIMF 211, may transmit the same functional split reconfiguration message to each RU of the set of a plurality of RUs. That is, the same functional split option may be reconfigured for a set of a plurality of RUs, and the start time of the same functional split option reconfiguration may be configured.

In case that the DU 120 of the disclosure includes a set of DUs, each corresponding to each of a plurality of RUs, it may be a plurality of functional split reconfiguration messages corresponding to a plurality of DUs and RUs transmitted from the AIMF 211 to the DU 120. For example, in case that the seventh functional split 340 option is applied to the first RU and the second RU, the DU 120, which has received the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1140*d*, channel information (antenna port mapping information or channel prediction associated information) may be transmitted from the RU 110 to the DU 120.

According to an embodiment, in case that the DU 120 determines that the antenna port mapping block or channel prediction block is moved due to the functional split reconfiguration, the DU 120 may receive antenna port mapping information or channel prediction associated information from the RU 110.

For example, assuming that the seventh functional split 340 option is applied to the RU 110 and DU 120, in case that the DU 120 receives, from the AIMF 211, a functional split reconfiguration message including reconfiguration information to the fourth functional split 320*b* option, in case that the functional split option is reconfigured from the seventh functional split 340 option to the fourth functional split 320*b* option, the DU 120 may determine that it is the case where the antenna port mapping block or channel prediction block is moved and receive antenna port mapping information or channel estimation associated information from the RU 110.

In operation s1150*d*, the RU 110 and DU 120 may reconfigure functional split option based on the information included in the functional split reconfiguration message.

According to an embodiment, in operation s1152*d*, the DU 120 may reconfigure functional split options based on the information included in the functional split reconfiguration message, and in operation s1154*d*, the RU 110 may reconfigure functional split option based on the information included in the functional split reconfiguration message. Here, reconfiguration of the functional split option of the RU 110 and DU 120 may be performed simultaneously or sequentially.

In operation s1160*d*, the RU 110 may transmit a functional split reconfiguration complete message of the RU 110 to the DU 120.

In operation s1170*d*, the DU 120 may transmit the functional split reconfiguration complete message of the RU 110 and DU 120 to the AIMF 211.

In case that the AIMF 211 receives the functional split reconfiguration complete message from the DU 120, it may identify that the functional split reconfiguration of the RU 110 and DU 120 has been completed.

Next, the functional split process by the NF 400, AMF 170, RU 110, and DU 120 according to an embodiment of the disclosure will be described with reference to FIGS. 12A to 12D. Here, the NF 400 may be any one of the NFs described in FIG. 1 or FIG. 2 and may refer to any one NF on the core network.

Figure 12A:
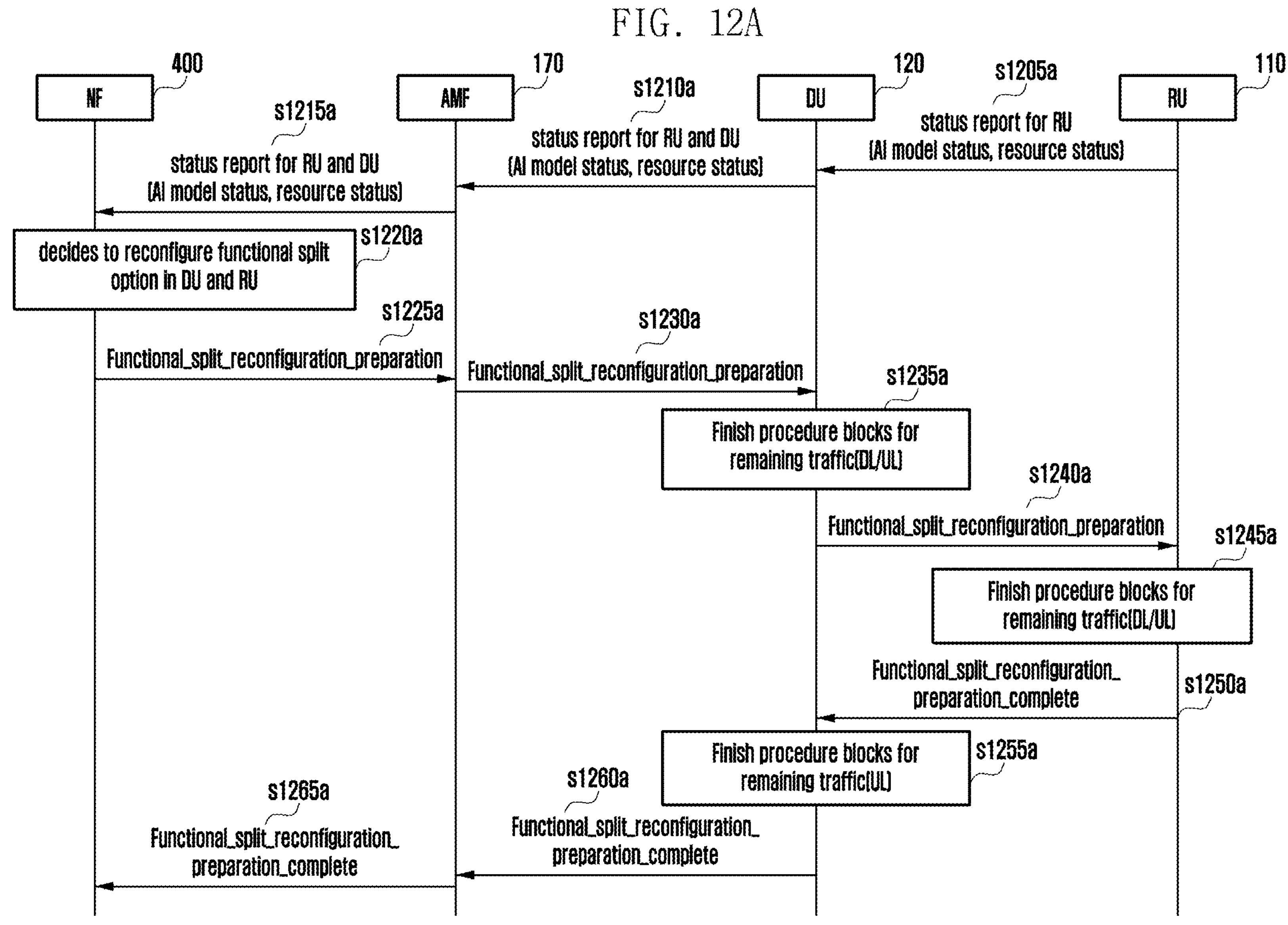
FIG. 12A illustrates a signal flow diagram of a functional split preparation process by network function (NF), access and mobility management function (AMF), RU, and DU according to an embodiment of the disclosure.

FIG. 12A illustrates a signal flow diagram of a functional split preparation process by the NF 400, AMF 170, RU 110, and DU 120 according to an embodiment of the disclosure.

With reference to FIG. 12A, in operation s1205*a*, the RU 110 may transmit a state report of the RU 110 to the DU 120.

Here, the state report of RU 110 may include information about at least one of the followings:

AI function state of the RU 110,
resource state of the RU 110,
other hardware constraints of the RU 110, or
wireless communication environment of the RU 110
in addition to the above-mentioned matters, various matters that may be considered when applying AI function to the RU 110.

In operation s1210*a*, the DU 120 may transmit state reports of the RU 110 and DU 120 to the AMF 170.

Here, the state reports of RU 110 and DU 120 may include information about at least one of the followings:

information included in the state report of the RU 110,
AI function state of the DU 120,
resource state of the DU 120,
other hardware constraints of the DU 120,
wireless communication environment of the DU 120, or
in addition to the above-mentioned matters, various matters that may be considered when applying AI function to the RU 110 and DU 120.

In operation s1215*a*, the AMF 170 may transmit the state report of the RU 110 and DU 120 received from the DU 120 to the NF 400.

In operation s1220*a*, the NF 400 may determine whether functional split reconfiguration is performed based on the state reports of the RU 110 and DU 120 received from the AMF 170.

For example, the NF 400 may consider hardware constraints of the RU 110 and DU 120, resource state, wireless communication environment, other environmental constraints, or AI function state, based on the state reports of the RU 110 and DU 120, and in addition to the above-mentioned matters, additionally consider various matters that may be considered when applying the AI function to the RU 110 and DU 120 to determine whether it is necessary to perform functional split.

According to an embodiment, the NF 400 may determine that functional split is necessary for the embodiments described in FIGS. 6 to 8.

In operation s1225*a*, in case that it is determined by the NF 400 that functional split reconfiguration is necessary, the NF 400 may transmit a functional split reconfiguration preparation message to the DU 120.

In operation s1230*a*, the AMF 170 may transmit the functional split reconfiguration preparation message received from the NF 400 to the DU 120.

In operation s1235*a*, the DU 120 may complete transmission of the already transmitting traffic (UL/DL) of the block corresponding to the PHY function process based on the functional split reconfiguration preparation message.

In operation s1240*a*, the DU 120 may transmit the functional split reconfiguration preparation message to the RU 110. Here, the functional split reconfiguration preparation message may be a message received from the NF 400 through the AMF 170.

Here, the functional split reconfiguration preparation message may be as follows.

In case that the RU 110 refers to a set of a plurality of RUs located at different locations, it may be a functional split reconfiguration preparation message that is equally transmitted from one DU 120, respectively, for a set of a plurality of RUs connected to the DU 120. For example, the DU 120, which has received the functional split reconfiguration preparation message from the NF 400 through the AMF 170, may transmit the same functional split reconfiguration preparation message to each RU of the set of a plurality of RUs.

In case that the DU 120 of the disclosure includes a set of DUs each corresponding to each of a plurality of RUs, it may be a plurality of functional split reconfiguration preparation messages each corresponding to each of the plurality of DUs transmitted from the NF 400 to the DU 120 through the AMF 170. For example, the DU 120, which has received the functional split reconfiguration preparation message including functional split reconfiguration information corresponding to each of a plurality of RUs from the NF 400 through the AMF 170, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1245*a*, the RU 110 may complete transmission of the already transmitting traffic (DL/UL) of the block corresponding to the PHY function process based on the functional split reconfiguration preparation message.

In operation s1250*a*, the RU 110 may transmit a functional split reconfiguration preparation complete message to the DU 120.

In operation s1255*a*, the DU 120 may complete transmission of the already transmitting traffic (UL) of the block corresponding to the PHY function process based on the functional split reconfiguration preparation message.

In operation s1260*a*, DU 120 may transmit the functional split reconfiguration preparation complete message to the AMF 170.

In operation s1265*a*, the AMF 170 may transmit the functional split reconfiguration preparation complete message received from the DU 120 to the NF 400.

The NF 400 may receive the functional split reconfiguration preparation complete message from the DU 120 through the AMF 170 and identify that the functional split reconfiguration of the RU 110 and DU 120 has been prepared.

FIG. 12B illustrates a signal flow diagram of a functional split preparation process by the NF 400, AMF 170, RU 110, and DU 120 according to an embodiment of the disclosure.

With reference to FIG. 12B, in operation s1205*b*, the RU 110 and DU 120 may determine whether functional split reconfiguration is necessary based on the information about the state of the RU 110 and the information about the state of the DU 120.

According to an embodiment, the DU 120 may receive the information about the state of the RU 110 from the RU 110, and may consider hardware constraints of the RU 110 and DU 120, resource state, wireless communication environment, other environmental constraints, or AI function state, and in addition to the above-mentioned matters, additionally consider various matters that may be considered when applying the AI function to the RU 110 and DU 120 to determine whether it is necessary to perform functional split.

According to an embodiment, the RU 110 and/or DU 120 may determine that functional split is necessary for the embodiments described in FIGS. 6 to 8. For example, the DU 120 may receive information about the state of the RU 110 from the RU 110 and determine whether functional split is necessary.

In case that it is determined that functional split is necessary, in operation s1210*b*, the DU 120 may transmit a functional split reconfiguration request message to the AMF 170.

In operation s1215*b*, the AMF 170 may transmit the functional split reconfiguration request message to the NF 400.

In operation s1220*b*, the NF 400 may transmit the functional split reconfiguration preparation message to the AMF 170.

In operation s1225*b*, the AMF 170 may transmit the functional split reconfiguration preparation message received from the NF 400 to the DU 120.

In operation s1230*b*, the DU 120 may complete transmission of the already transmitting traffic (UL/DL) of the block corresponding to the PHY function process based on the functional split reconfiguration preparation message.

In operation s1235*b*, the DU 120 may transmit the functional split reconfiguration preparation message to the RU 110. Here, the functional split reconfiguration preparation message may be a message received from the NF 400 through the AMF 170.

Here, the functional split reconfiguration preparation message may be as follows.

- In case that the RU 110 refers to a set of a plurality of RUs located at different points, it may be a functional split reconfiguration preparation message that is equally transmitted from one DU 120, respectively, for a set of a plurality of RUs connected to the DU 120. For example, the DU 120, which has received the functional split reconfiguration preparation message from the NF 400 through the AMF 170, may transmit the same functional split reconfiguration preparation message to each RU of the set of a plurality of RUs.
- In case that the DU 120 of the disclosure includes a set of DUs each corresponding to each of a plurality of RUs, it may be a plurality of functional split reconfiguration preparation messages each corresponding to each of the plurality of DUs transmitted from the NF 400 to the DU 120 through the AMF 170. For example, the DU 120, which has received the functional split reconfiguration preparation message including functional split reconfiguration information corresponding to each of a plurality of RUs from the NF 400 through the AMF 170, may transmit, to the first RU, a first functional split reconfiguration preparation message corresponding to the first RU, and may transmit, to the second RU, a second functional split reconfiguration preparation message corresponding to the second RU. Each functional split reconfiguration preparation message may include different functional split option information.

In operation s1240*b*, the RU 110 may complete transmission of the already transmitting traffic (DL/UL) of the block corresponding to the PHY function process based on the functional split reconfiguration preparation message.

In operation s1245*b*, the RU 110 may transmit a functional split reconfiguration preparation complete message to the DU 120.

In operation s1250*b*, the DU 120 may complete transmission of the already transmitting traffic (UL) of the block corresponding to the PHY function process based on the functional split reconfiguration preparation message.

In operation s1255*b*, the DU 120 may transmit a functional split reconfiguration preparation complete message to the AMF 170.

In operation s1260*b*, the AMF 170 may transmit the functional split reconfiguration preparation complete message received from the DU 120 to the NF 400.

The NF 400 may receive the functional split reconfiguration preparation complete message from the DU 120 through the AMF 170 and identify that the functional split reconfiguration of the RU 110 and DU 120 has been prepared.

FIG. 12C illustrates a signal flow diagram of a functional split process by the NF 400, AMF 170, RU 110, and DU 120 according to an embodiment of the disclosure.

With reference to FIG. 12C, in operation s1210*c*, the NF 400 may identify that preparation for functional split of the RU 110 and DU 120 has been completed. For example, in case that the NF 400 receives a functional split preparation complete message from the DU 120 through the AMF 170, it may determine that preparation for functional split of the RU 110 and DU 120 has been completed.

In operation s1220*c*, the NF 400 may transmit a functional split reconfiguration message to the AMF 170.

Here, the functional split reconfiguration message may include at least one of the followings:

- reconfiguration information for functional split option, or
- functional split option reconfiguration start time information In operation s1230*c*, the AMF 170 may transmit the functional split reconfiguration message received from the NF 400 to the DU 120.

In operation s1240*c*, the DU 120 may transmit the functional split reconfiguration message received from the AMF 170 to the RU 110. Here, the functional split reconfiguration message may be a message received by the DU 120 from the NF 400 through the AMF 170.

In addition, here the functional split reconfiguration message may be as follows.

- In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the NF 400 through the AMF 170, may transmit the same functional split reconfiguration message to each RU of the set of a plurality of RUs. That is, the same functional split option may be reconfigured for a set of a plurality of RUs, and the start time of the same functional split option reconfiguration may be configured.
- In case that the DU 120 of the disclosure includes a set of DUs each corresponding to each of a plurality of RUs, it may be a plurality of functional split reconfiguration messages corresponding to a plurality of DUs and RUs transmitted from the NF 400 to the DU 120 through the AMF 170. For example, in case that the seventh functional split 340 option is applied to the first RU and the second RU, the DU 120, which has received, from the NF 400 through the AMF 170, the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1260*c*, the RU 110 and DU 120 may reconfigure functional split option based on the information included in the functional split reconfiguration message.

According to an embodiment, in operation s1262*c*, the DU 120 may reconfigure functional split option based on the information included in the functional split reconfiguration message, and in operation s1264*c*, the RU 110 may reconfigure the functional split option based on the information included in the functional split reconfiguration message. Here, reconfiguration of the functional split option of the RU 110 and DU 120 may be performed simultaneously or sequentially.

In operation s1270*c*, the RU 110 may transmit a functional split reconfiguration complete message of the RU 110 to the DU 120.

In operation s1280*c*, the DU 120 may transmit the functional split reconfiguration complete message of the RU 110 and DU 120 to the AMF 170.

In operation s1290*c*, the AMF 170 may transmit the functional split reconfiguration complete message of the RU 110 and DU 120 received from the DU 120 to the NF 400.

In case that the NF 400 receives the functional split reconfiguration complete message from the DU 120 through the AMF 170, it may identify that the functional split reconfiguration of the RU 110 and DU 120 has been completed.

FIG. 12D illustrates a signal flow diagram of a functional split process by the NF, AMF, RU, and DU including a channel information transmission process according to an embodiment of the disclosure.

With reference to FIG. 12D, in operation s1210*d*, the NF 400 may identify that preparation for functional split of the RU 110 and DU 120 has been completed. For example, in case that the NF 400 receives a functional split preparation complete message from the DU 120 through the AMF 170, it may determine that preparation for functional split of the RU 110 and DU 120 has been completed.

In operation s1220*d*, the NF 400 may transmit a functional split reconfiguration message to the AMF 170.

Here, the functional split reconfiguration message may include at least one of the followings:

reconfiguration information for functional split option, or functional split option reconfiguration start time information In operation s1230*d*, the AMF 170 may transmit the functional split reconfiguration message received from the NF 400 to the DU 120.

In operation s1240*d*, the DU 120 may transmit the functional split reconfiguration message received from the AMF 170 to the RU 110. Here, the functional split reconfiguration message may be a message received by the DU 120 from the NF 400 through the AMF 170.

In addition, here the functional split reconfiguration message may be as follows.

In case that the RU 110 refers to a set of a plurality of RUs located at different points, it may be a functional split reconfiguration message that is equally transmitted from one DU 120, respectively, for a set of a plurality of RUs connected to the DU 120. For example, the DU 120, which has received the functional split reconfiguration message from the NF 400 through the AMF 170, may transmit the same functional split reconfiguration message to each RU of the set of a plurality of RUs. That is, the same functional split option may be reconfigured for a set of a plurality of RUs, and the start time of the same functional split option reconfiguration may be configured.

In case that the DU 120 of the disclosure includes a set of DUs, each corresponding to each of a plurality of RUs, it may be a plurality of functional split reconfiguration messages corresponding to a plurality of DUs and RUs transmitted from the NF 400 to the DU 120 through the AMF 170. For example, in case that the seventh functional split 340 option is applied to the first RU and the second RU, the DU 120, which has received, from the NF 400 through the AMF 170, the functional split reconfiguration message including functional split reconfiguration information corresponding to each of the first RU and the second RU, may transmit, to the first RU, a first functional split reconfiguration message including reconfiguration information to the sixth functional split 330 option corresponding to the first RU and reconfiguration start time information for the first RU, and may transmit, to the second RU, a second functional split reconfiguration message including reconfiguration information to the fifth functional split 325 option corresponding to the second RU and reconfiguration start time information for the second RU.

In operation s1250*d*, channel information (antenna port mapping information or channel prediction associated information) may be transmitted from the RU 110 to the DU 120.

According to an embodiment, in case that the DU 120 determines that the antenna port mapping block or channel prediction block is moved due to functional split reconfiguration, the DU 120 may receive the antenna port mapping information or channel prediction associated information from the RU 110.

For example, assuming that the 7th functional split 340 option is applied to the RU 110 and DU 120, in case that the DU 120 receives the functional split reconfiguration message including reconfiguration information to the fourth functional split 320*b* option from the NF 400 through the AMF 170, in case that the functional split option is reconfigured from the seventh functional split 340 option to the fourth functional split 320*b* option, the DU 120 may determine that it is a case where the antenna port mapping block or channel prediction block is moved, and receive the antenna port mapping information or channel prediction associated information from the RU 110.

In operation s1260*d*, the RU 110 and DU 120 may reconfigure functional split option based on the information included in the functional split reconfiguration message.

According to an embodiment, in operation s1262*d*, the DU 120 may reconfigure functional split option based on the information included in the functional split reconfiguration message, and in operation s1264*d*, the RU 110 may reconfigure functional split option based on the information included in the functional split reconfiguration message. Here, reconfiguration of the functional split option of the RU 110 and DU 120 may be performed simultaneously or sequentially.

In operation s1270*d*, the RU 110 may transmit a functional split reconfiguration complete message of the RU 110 to the DU 120.

In operation s1280*d*, the DU 120 may transmit the functional split reconfiguration complete message of the RU 110 and DU 120 to the AMF 170.

In operation s1290*d*, the AMF 170 may transmit the functional split reconfiguration complete message of the RU 110 and DU 120 received from the DU 120 to the NF 400.

In case that the NF 400 receives the functional split reconfiguration complete message from the DU 120 through the AMF 170, it may identify that the functional split reconfiguration of the RU 110 and DU 120 has been completed.

Next, the AI function location change notification method by the RU 110, DU 120, and data collection entity 500 according to an embodiment of the disclosure will be described with reference to FIGS. 13 and 14. Here, the data collection entity 500 may be an entity that performs a data collection function among the NFs of the core network described in FIG. 1 or FIG. 2.

Figure 13:
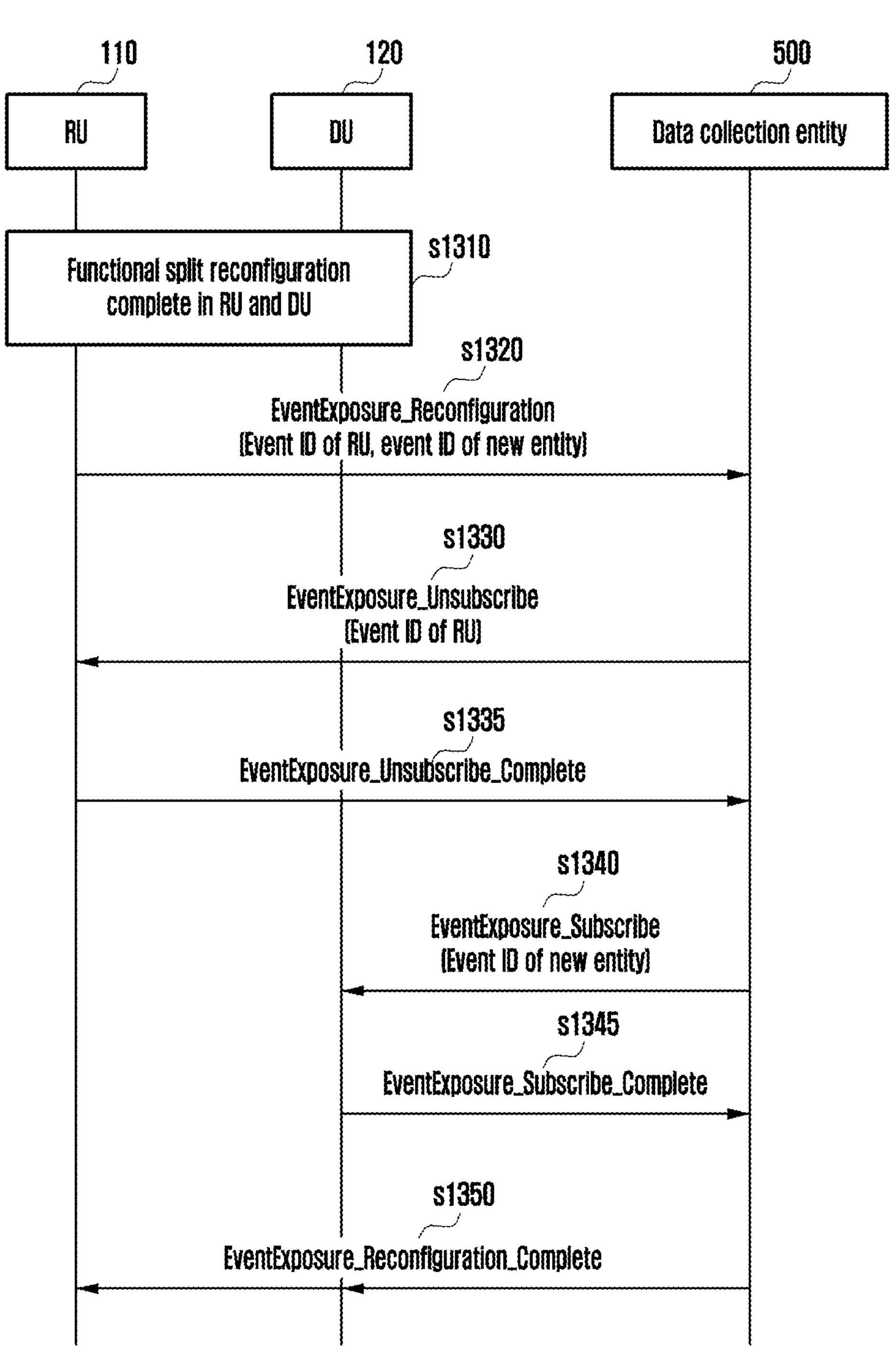
FIG. 13 illustrates a signal flow diagram of an AI function location change notification method according to an embodiment of the disclosure.

FIG. 13 illustrates a signal flow diagram of an AI function location change notification method according to an embodiment of the disclosure.

With reference to FIG. 13, in operation s1310, reconfiguration of the functional split option of the RU 110 and DU 120 may be completed.

In operation s1320, the RU 110 may transmit an event exposure reconfiguration (EventExposure_Reconfiguration) message to the data collection entity 500.

Here, the event exposure reconfiguration message may include at least one of the followings:

event identification (ID) information of the RU 110, or event ID information for a new entity Here, the event ID of the new entity may be the event ID of the DU, for example, in case that the location of the AI function is moved from the RU 110 to the DU 120 due to reconfiguration of the functional split option.

In operation s1330, the data collection entity 500 may transmit an event exposure unsubscribe (EventExposure_Unsubscrbe) message to the RU 110.

Here, the event exposure un-subscription message may include event ID information of the RU 110.

In operation s1335, the RU 110 may transmit an event exposure unsubscribe completion (Event Exposure_Unsubscribe_Complete) message to the data collection entity 500.

Here, the event exposure unsubscribe complete message may be a message indicating that the unsubscribe of the data collection entity 500 for the RU 110 has been completed.

In operation s1340, the data collection entity 500 may transmit an event exposure subscription (EventExposure_Subscribe) message to the DU 120.

Here, the event exposure subscription message may include event ID information of the DU 120.

In operation s1345, the DU 120 may transmit an event exposure subscription completion (Event Exposure_Subscribe_Complete) message to the data collection entity 500.

Here, the event exposure subscription complete message may be a message indicating that the subscription of the data collection entity 500 for the DU 120 has been completed.

In operation s1350, the data collection entity 500 may transmit an event exposure reconfiguration completion (EventExposure_Reconfiguration_Complete) message to the RU 110 and DU 120.

According to an embodiment, the data collection entity 500 may transmit an event exposure reconfiguration complete message to the DU 120, and the DU 120 may transmit the received event exposure reconfiguration complete message to the RU 110.

The embodiment in FIG. 13 assumes that the location of the AI function is changed from the RU 110 to the DU 120 according to reconfiguration of the functional split option. However, the embodiment in FIG. 13 may also be applied to a case where the location of the AI function changes from the DU 120 to the RU 110 according to reconfiguration of the functional split option.

For example, the data collection entity 500 may transmit the event exposure unsubscribe message to the DU 120, and the DU 120 may transmit the event exposure unsubscribe complete message to the data collection entity 500. In addition, the data collection entity 500 may transmit the event exposure subscription message to the RU 110, and the RU 110 may transmit the event exposure subscription complete message to the data collection entity 500. In case that subscription and unsubscribe to the changed location of the AI function are completed, the data collection entity 500 may transmit the event exposure reconfiguration complete message to the RU 110 and DU 120.

Figure 14:
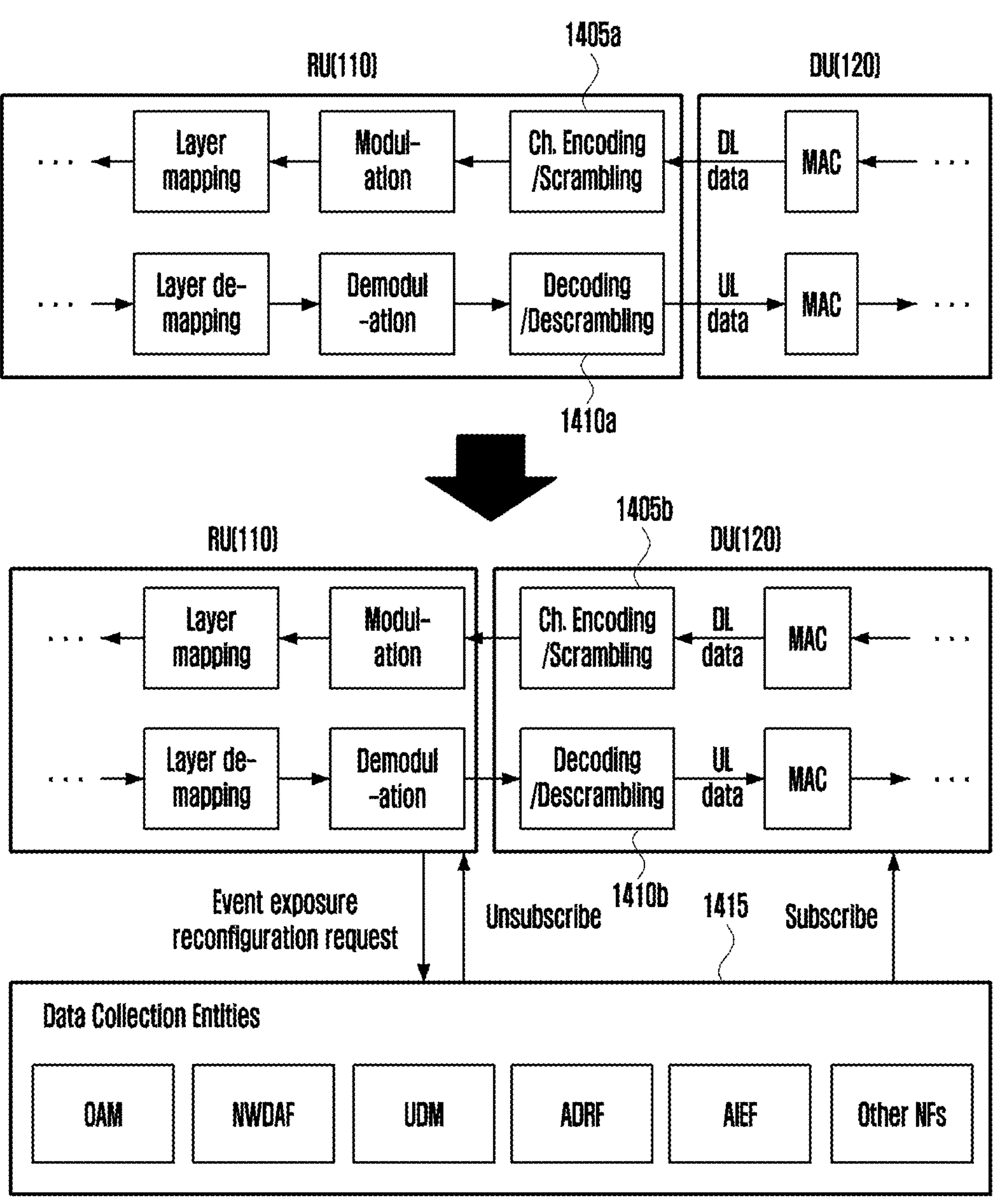
FIG. 14 illustrates a diagram for explaining the AI function location change notification method described in FIG. 13.

FIG. 14 illustrates a diagram for explaining the AI function location change notification method described in FIG. 13.

With reference to FIG. 14, in case that the AI function is applied to the channel encoding/scrambling (or channel decoding/scrambling) process, the AI function application structure of the RU 110 and DU 120 and the data collection entity 1415 before and after reconfiguring the functional split option are illustrated.

In the case before reconfiguring the functional split option, it may be a state where the seventh functional split 340 option is applied. That is, the RU 110 performs up to channel encoding/scrambling 1405*a* (or channel decoding/scrambling 1410*a*) in both DL and UL, and the DU 120 may be in a state to perform subsequent higher functions.

For example, in case that it is determined that reconfiguration of the functional split option is necessary while the seventh functional split 340 option is applied, functional split option reconfiguration may be performed. In case that functional split option reconfiguration is performed, the seventh functional split 340 option may be reconfigured to the sixth functional split 330 option. In this case, the DU 120 may perform up to the channel encoding/scrambling 1405*b* (or channel decoding/scrambling 1410*b*).

According to an embodiment, in case that the AI function is moved from the RU 110 to the DU 120 as above, a subscriber for the corresponding AI function may need to subscribe to a new entity to which the corresponding AI function is newly applied as the entity to which the AI function is applied is changed. In this case, the subscriber of the corresponding AI function may unsubscribe to the RU 110 from which the AI function has been deleted and subscribe to the DU 120 to which the AI function has been added. Here, the subscriber may be, for example, NWDAF 190, UDM (not shown), ADRF (not shown), AIEF 213, or NFs that perform a data collection function in the core network. Alternatively, the subscriber may refer to other external servers, including the OAM 200, connected through an external network.

According to the above-described embodiments, a data collection entity 500, such as NWDAF, may receive notification of a change in the location of the AI function due to reconfiguration of the functional split option and request subscription to a new entity to which the corresponding AI function newly added. Therefore, even if the functional split option is reconfigured, offline training for the AI model may continue to be performed as it performs subscription to a new entity to which the corresponding AI function is added.

In addition, data collected through the data collection process may be stored in a data storage 615*b* included in the DU 120. In case that the AI function is moved to the DU 120 as the functional split option is reconfigured, the DU 120 may generate a trained AI model through an AI model learning process after data collection, and transmit the trained AI model to the RU 110.

According to an embodiment, in case that the AI function is initially installed in the RU 110, the AI model may be frequently updated until the AI function is stabilized, so reconfiguration of functional split option may be necessary until the AI function is stabilized. That is, in case that the functional split option is the seventh functional split 340 option, reconfiguration to an option lower than the seventh functional split 340 option may be necessary. In case that the AI function is stabilized, functional split option may be recovered to its original state.

According to an embodiment, in case that an environmental change occurs in the RU 110, for example, in case that the hardware of the RU 110 is damaged or a problem occurs in the wireless communication environment, there is a risk that the performance of the AI function will deteriorate. Therefore, reconfiguration of functional split option may be necessary. That is, in case that the functional split option is the seventh functional split 340 option, reconfiguration to an option lower than the seventh functional split 340 option may be necessary.

Figure 15:
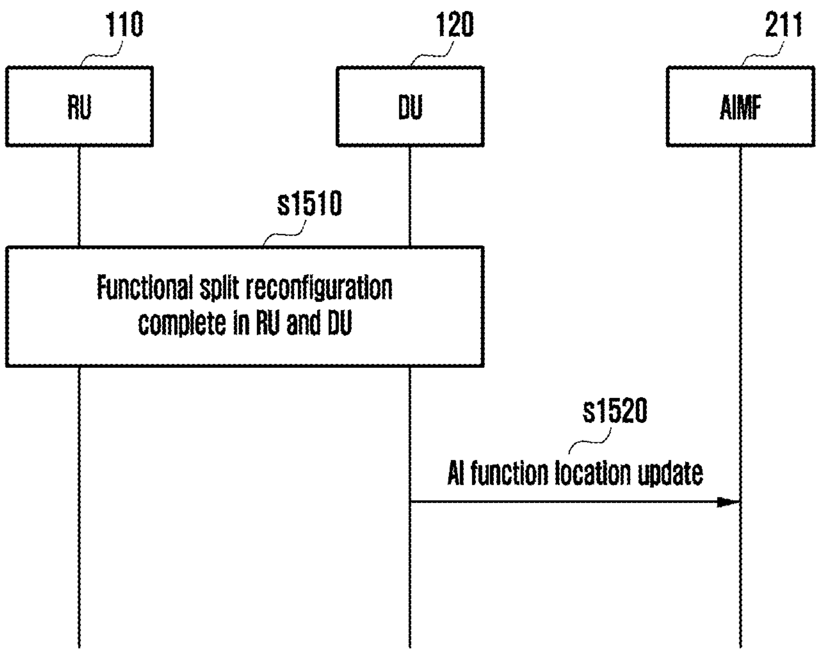
FIG. 15 illustrates a signal flow diagram of a process in which DU transmits an AI function location change notification to AIMF according to an embodiment of the disclosure.

FIG. 15 illustrates a signal flow diagram of a process in which the DU 120 transmits an AI function location change notification to the AIMF 211 according to an embodiment of the disclosure. Here, the AIMF 211 is not limited to the AI plane 210 and may be implemented in CP or MP. That is, the AIMF 211 may be distributed and deployed in each NF.

With reference to FIG. 15, in operation s1510, reconfiguration of the functional split option of the RU 110 and DU 120 may be completed.

In operation s1520, the DU 120 may transmit an AI function location update message to the AIMF 211.

The AIMF 211 may receive the AI function location update message from the DU 120 and update the location of the AI function.

The signal flow diagrams in the embodiments of FIGS. 3 to 15 described above illustrate example methods that can be implemented according to the principles of the disclosure, and various changes may be made to the methods illustrated in the signal flow diagrams herein. For example, while a series of operations is illustrated, various operations in each drawing could overlap, occur in parallel, occur in a different order, or occur multiple times. In another example, an operation may be omitted or replaced by other operations.

Figure 16:
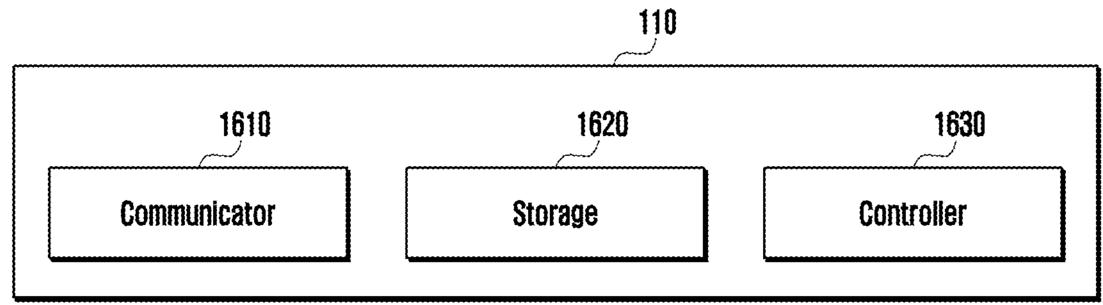
FIG. 16 illustrates a diagram of a structure of a RU of a base station in a wireless communication system according to an embodiment of the disclosure.

FIG. 16 illustrates a diagram of a structure of the RU 110 of the base station in a wireless communication system according to an embodiment of the disclosure.

With reference to FIG. 16, the RU 110 includes a communicator 1610, a storage 1620, and a controller 1630.

The communicator 1610 performs functions for transmitting/receiving signals through wireless channels, such as band conversion and amplification of signals. That is, the communicator 1610 up-converts a baseband signal into an RF band signal and then, transmits the same through an antenna and down-converts the RF band signal received through the antenna into a baseband signal. For example, the communicator 1610 may include a transmission filter, a reception filter, an amplifier, a mixer, an oscillator, a digital-to-analog converter (DAC), an analog-to-digital converter (ADC), and the like. Although only one antenna is illustrated in the drawings, the first access node may include a plurality of antennas. Also, the communicator 1610 may include a plurality of RF chains. In addition, the communicator 1610 may perform beamforming. For beamforming, the communicator 1610 may adjust the phase and magnitude of each of the signals transmitted/received through a plurality of antennas or antenna elements. The communicator 1610 may perform a downlink MIMO operation by transmitting one or more layers.

The communicator 1610 performs a function of conversion between a baseband signal and a bit string according to a physical layer specification of a first radio access technique. For example, in the case of data transmission, the communicator 1610 encodes and modulates transmission bit strings, thereby generating complex symbols. In addition, upon receiving data, the communicator 1610 demodulates and decodes a baseband signal to thus recover reception bit strings. For example, in the case where an orthogonal frequency division multiplexing (OFDM) scheme is applied, when transmitting data, the communicator 1610 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the communicator 1610 divides the baseband signal into OFDM symbol units, restores the signals mapped to the subcarriers through a fast Fourier transform (FFT) operation, and then restores reception bit strings through demodulation and decoding. The communicator 1610 transmits and receives signals as described above.

Although not illustrated in FIG. 16, the communicator 1610 may further include an interface unit. The interface unit may perform a fronthaul interface function between the RU 110 and the DU 120. The RU 110 and DU 120 may be connected to the fronthaul, and the RU 110 and DU 120 may perform PHY functions separately. For example, for fronthaul operation, the RU 110 and DU 120 may use a fronthaul interface of the common public radio interface (CPRI), enhanced common public radio interface (eCPRI), or radio over ethernet (ROE) standard.

The storage 1620 stores data such as basic programs, application programs, and configuration information for the operation of the RU 110. The storage 1620 may be constituted with volatile memory, nonvolatile memory, or a combination of volatile memory and nonvolatile memory. In addition, the storage 1620 provides stored data according to a request by the controller 1630.

The controller 1630 controls the overall operation of the RU 110. For example, the controller 1630 transmits and receives signals through the communicator 1610. In addition, the controller 1630 records and reads data in and from the storage 1620. In addition, the controller 1630 may perform protocol stack functions required by communication standards. To this end, the controller 1630 may include at least one processor. The controller 1630 may include various modules for performing communication.

According to some embodiments of the disclosure, in case of reconfiguring the functional split option of the RU 110, the controller 1630 may perform a PHY function corresponding to the reconfigured functional split option. In this case, DU 120 may perform the remaining PHY functions. For example, in case that the functional split option of the RU 110 is reconfigured to the sixth functional split 330 option, the controller 1630 may even perform modulation (or demodulation) of the PHY functions in both DL and UL. The DU 120 may perform higher PHY functions including subsequent encoding/scrambling (or decoding/descrambling).

The constitution of the RU 110 illustrated in FIG. 16 is merely an example, and an example of the RU 110 that performs various embodiments of the disclosure is not limited to the constitution illustrated in FIG. 16. That is, according to various embodiments, a part of the constitution may be added, removed, or changed.

Figure 17:
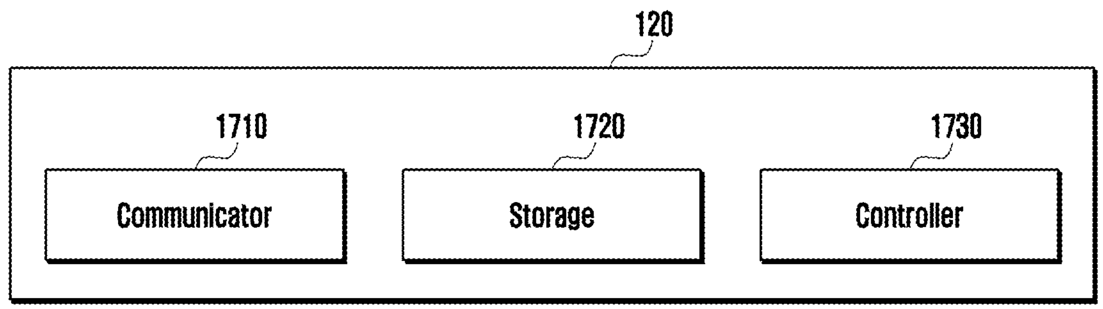
FIG. 17 illustrates a diagram of a structure of a DU of a base station in a wireless communication system according to an embodiment of the disclosure.

FIG. 17 illustrates a diagram of the structure of the DU 120 of the base station in a wireless communication system according to an embodiment of the disclosure.

With reference to FIG. 17, the DU 120 includes a communicator 1710, a storage 1720, and a controller 1730.

The communicator 1710 may perform functions for transmitting and receiving signals in a wired communication environment. The communicator 1710 may include a wired interface for controlling direct connection between devices through a transmission medium (e.g., copper wire, optical fiber). For example, the communicator 1710 may transmit an electrical signal to another device through a copper wire or perform conversion between an electrical signal and an optical signal. The communicator 1710 may be connected to the RU 110. In addition, the communicator 1710 may be connected to the core network or to the CU 130 in a distributed arrangement.

The communicator 1710 may perform functions for transmitting and receiving signals in a wireless communication environment. For example, the communicator 1710 may perform a conversion function between a baseband signal and a bit string according to the PHY standard of the system. For example, in the case of data transmission, the communicator 1710 encodes and modulates transmission bit strings, thereby generating complex symbols. In addition, upon receiving data, the communicator 1710 demodulates and decodes a baseband signal to thus recover reception bit strings. In addition, the communicator 1710 may include a plurality of transmission/reception paths. In addition, according to an embodiment, the communicator 1710 may be connected to a core network or connected to other nodes (e.g., integrated access backhaul (IAB)).

The communicator 1710 may transmit and receive signals. To do this, the communicator 1710 may include at least one transceiver. For example, the communicator 210 may transmit a synchronization signal, reference signal, system information, message, control message, stream, control information, data, and the like. In addition, the communicator 1710 may perform beamforming.

The communicator 1710 transmits and receives signals as described above. Accordingly, all or part of the communicator 1710 may be referred to as a “transmitter”, a “receiver”, or a “transceiver”.

Although not illustrated in FIG. 17, the communicator 1710 may further include a backhaul communicator for connection to the core network or another base station. The backhaul communicator provides an interface for performing communication with other nodes in the network. That is, the backhaul communicator converts a bit string, transmitted from the base station to another node, such as another access node, another base station, a higher node, a core network, etc., into a physical signal, and converts physical signals received from other nodes into bit strings.

In addition, although not illustrated in FIG. 17, the communicator 1710 may further include an interface unit. The interface unit may perform a fronthaul interface function between the RU 110 and the DU 120. The RU 110 and DU 120 may be connected to the fronthaul, and the RU 110 and DU 120 may perform PHY functions separately. For example, for fronthaul operation, the RU 110 and DU 120 may use a fronthaul interface of a CPRI, eCPRI, or ROE standard.

The storage 1720 stores data such as basic programs, application programs, and configuration information for the operation of the DU 120. The storage 1720 may include a memory. The storage 1720 may be constituted with volatile memory, nonvolatile memory, or a combination of volatile memory and nonvolatile memory. In addition, the storage 1720 provides stored data according to a request by the controller 1730. According to an embodiment, the storage 1720 may store scheduling information (e.g., beam information, antenna port information) and flow information (e.g., eAxC) for each stream.

The controller 1730 controls the overall operation of the DU 120. For example, the controller 1730 transmits and receives signals through the communicator 1710. For example, the controller 1730 transmits and receives signals through a backhaul communicator or fronthaul communicator. In addition, the controller 1730 may record and read data in and from the storage 1720. In addition, the controller 1730 may perform protocol stack functions required by communication standards. To this end, the controller 1730 may include at least one processor. In some embodiments, the controller 1730 may include a control message generator including resource allocation information for scheduling a plurality of layers and a flow identifier for transmitting the corresponding control message. The control message generator and flow identifier may be a storage space in which the instruction/code is stored as an instruction/code temporarily resided in the controller 1730, as an instruction set or code stored in the storage 1720, or may be part of a circuitry which constitutes the controller 1730.

According to some embodiments of the disclosure, in case of reconfiguring the functional split option of the DU 120, the controller 1730 may perform a PHY function corresponding to the reconfigured functional split option. In this case, RU 110 may perform the remaining PHY functions. For example, in case that the functional split option of the DU 120 is reconfigured to the sixth functional split 330 option, the controller 1730 may perform higher PHY functions including encoding/scrambling (or decoding/descrambling) after modulation (or demodulation) among PHY functions in both DL and UL. In this case, the RU 110 reconfigured to the sixth functional split 330 option may even perform modulation (or demodulation) among the PHY functions.

The constitution of the DU 120 illustrated in FIG. 17 is merely an example, and an example of the DU 120 that performs various embodiments of the disclosure is not limited to the constitution illustrated in FIG. 17. That is, according to various embodiments, a part of the constitution may be added, removed, or changed.

The methods according to embodiments as described in the specification or in the claims of the disclosure may be implemented as hardware, software, or a combination of hardware and software.

In case of being implemented in software, a computer-readable recording medium having one or more programs (software modules) recorded thereon may be provided. One or more programs stored in the computer-readable storage medium are configured for execution by one or more processors in an electronic device. The one or more programs include instructions for causing the electronic device to execute the methods according to the embodiments of the disclosure described in the claims or the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory including a combination of some or all of the above-mentioned memory devices. Also, a plurality of such memories may be included.

Also, the programs may be stored in an attachable storage device which is accessible via a communication network constituted by, for example, the Internet, an intranet, a local area network (LAN), a wireless LAN (WLAN), or a storage area network (SAN), or a combination thereof. Such a storage device may access, via an external port, a device performing the embodiments of the disclosure. Furthermore, a separate storage device on the communication network may access the electronic device performing the embodiments of the disclosure.

In the specific embodiments of the disclosure described above, elements included in the embodiments are expressed in a singular or plural form according to the specific embodiments. However, the singular or plural form is appropriately selected for convenience of descriptions and the disclosure is not limited to the singular or plural elements. As such, an element expressed in a plural form may also be constituted as a single element, and an element expressed in a singular form may also be constituted as plural elements.

Meanwhile, the embodiments of the disclosure described with reference to the specification and the drawings are merely illustrative of specific examples to easily facilitate description and understanding of the disclosure, and are not intended to limit the scope of the disclosure. That is, it will be obvious to one of ordinary skill in the art that various modifications may be made based on the technical spirit of the disclosure. Also, the respective embodiments may be combined to be implemented, when required. For example, the base station and UE may be operated in a manner that portions of an embodiment of the disclosure are combined with portions of another embodiment of the disclosure. For example, the base station and UE may be operated in a manner that portions of a first embodiment of the disclosure are combined with portions of a second embodiment of the disclosure. Also, although the above embodiments are presented on the basis of the FDD LTE system, such embodiments or modifications thereof based on the same technical idea may be implemented in other systems such as the TDD LTE system, the 5G or NR system, and the like.

Meanwhile, the order of explanation in the drawings for explaining the method of the disclosure does not necessarily correspond to the order of execution, and the order of precedence may be changed or executed in parallel.

Also, drawings describing the method of the disclosure may omit some of the elements and include only some of the elements within the scope of not impairing the essence of the disclosure.

Also, the method of the disclosure may be executed by combining some or all of the contents included in each embodiment within a range that does not impair the essence of the disclosure.

Various embodiments of the disclosure have been described. The embodiments of the disclosure described above are merely examples, and the embodiments of the disclosure are not limited thereto. It will be understood by one of ordinary skill in the art that the embodiments of the disclosure may be easily modified in other specific forms without changing the technical spirit or the essential features of the disclosure. The scope of the disclosure is defined by the claims to be described rather than the detailed description, and all changes or modifications within the meaning and scope of the claims and their equivalents will be construed as being included in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a radio unit (RU) of a base station in a wireless communication system, comprising:

preparing for a functional split reconfiguration;

receiving a functional split reconfiguration message from a digital unit (DU) of the base station; and reconfiguring a functional split option so that an artificial intelligence (AI) function of the RU is moved to the DU based on split option reconfiguration information included in the functional split reconfiguration message.

2. The method of claim 1, wherein the preparing for the functional split reconfiguration comprises:

determining whether the functional split reconfiguration is necessary; and completing transmission of traffic already being transmitted by the RU and traffic already being transmitted by the DU in case that it is determined that the functional split reconfiguration is necessary.

3. The method of claim 2, wherein the determining whether the functional split reconfiguration is necessary is based on at least one of a state of the AI function and whether another AI function needs to be added, a resource state of the RU, a resource state of the DU, or a current functional split option state, wherein the state of the AI function includes a data collection state, an AI model update state, an AI model deployment state, or an AI model learning state.

4. The method of claim 2, wherein the determining whether the functional split reconfiguration is necessary comprises:

determining that the functional split reconfiguration is necessary in any one of a case where a state of the AI function is a data collection state, a case where the state of the AI function is an AI model update state, a case where the state of the AI function is an AI model deployment state, a case where the state of the AI function is an AI model learning state, and a case of adding another AI function, wherein, in case that it is determined that the functional split reconfiguration is necessary, the reconfiguring the functional split option so that the AI function of the RU is moved to the DU comprises:

reconfiguring at least one downlink (DL) physical layer (PHY) function, including an encoding/scrambling function configured to be performed on the RU, to be performed on the DU, and reconfiguring at least one uplink (UL) PHY function, including a decoding/descrambling function configured to be performed on the RU, to be performed on the DU.

5. The method of claim 1, wherein the reconfiguring the functional split option comprises:

determining whether an antenna port mapping block of the RU or a channel prediction block of the RU is moved to the DU by the functional split option reconfiguration, based on the split option reconfiguration information;

transmitting, to the DU, channel information to be moved in case that the antenna port mapping block of the RU or the channel prediction block of the RU is moved to the DU; and reconfiguring the functional split option so that the AI function of the RU is moved to the DU, wherein, in case that location information of the AI function is changed by the functional split option reconfiguration, the reconfiguring the functional split option further comprising:

transmitting, to a data collection entity, an AI function location reconfiguration message;

receiving an unsubscribe message from the data collection entity; and receiving an AI function location reconfiguration complete message from the DU, wherein the AI function location reconfiguration complete message is received by the DU from the data collection entity.

6. A method performed by a digital unit (DU) of a base station in a wireless communication system, comprising:

preparing for a functional split reconfiguration;

receiving a functional split reconfiguration message from an artificial intelligence management function (AIMF);

transmitting the functional split reconfiguration message to a radio unit (RU) of the base station; and reconfiguring a functional split option so that an artificial intelligence (AI) function of the RU is moved to the DU based on split option reconfiguration information included in the functional split reconfiguration message.

7. The method of claim 6, wherein the preparing for the functional split reconfiguration comprises:

determining whether the functional split reconfiguration is necessary; and completing transmission of traffic already being transmitted by the RU and traffic already being transmitted by the DU in case that it is determined that the functional split reconfiguration is necessary.

8. The method of claim 7, wherein the determining whether the functional split reconfiguration is necessary is based on at least one of a state of the AI function and whether another AI function needs to be added, a resource state of the RU, a resource state of the DU, or a current functional split option state, wherein the state of the AI function includes a data collection state, an AI model update state, an AI model deployment state, or an AI model learning state.

9. The method of claim 7, wherein the determining whether the functional split reconfiguration is necessary comprises:

determining that the functional split reconfiguration is necessary in any one of a case where a state of the AI function is a data collection state, a case where the state of the AI function is an AI model update state, a case where the state of the AI function is an AI model deployment state, a case where the state of the AI function is an AI model learning state, and a case of adding another AI function, wherein, in case that it is determined that the functional split reconfiguration is necessary, the reconfiguring the functional split option so that the AI function of the RU is moved to the DU comprises:

reconfiguring at least one downlink (DL) physical layer (PHY) function, including an encoding/scrambling function configured to be performed on the RU, to be performed on the DU, and reconfiguring at least one uplink (UL) PHY function, including a decoding/descrambling function configured to be performed on the RU, to be performed on the DU.

10. The method of claim 6, wherein the reconfiguring the functional split option comprises:

determining whether an antenna port mapping block of the RU or a channel prediction block of the RU is moved to the DU by the functional split option reconfiguration, based on the split option reconfiguration information;

receiving, from the RU, channel information to be moved in case that the antenna port mapping block of the RU or the channel prediction block of the RU is moved to the DU; and reconfiguring the functional split option so that the AI function of the RU is moved to the DU, wherein, in case that location information of the AI function is changed by the functional split option reconfiguration, the reconfiguring the functional split option further comprising transmitting an AI function location information update message to the AIMF.

11. A radio unit (RU) of abase station in a wireless communication system, comprising:

a transceiver configured to transmit and receive a signal; and a controller configured to:

prepare for a functional split reconfiguration, receive a functional split reconfiguration message from a digital unit (DU) of the base station, and reconfigure a functional split option so that an artificial intelligence (AI) function of the RU is moved to the DU based on split option reconfiguration information included in the functional split reconfiguration message.

12. The RU of a base station of claim 11, wherein the controller is further configured to:

determine whether the functional split reconfiguration is necessary, and complete transmission of traffic already being transmitted by the RU and traffic already being transmitted by the DU in case that it is determined that the functional split reconfiguration is necessary.

13. The RU of a base station of claim 12, wherein the controller is further configured to:

determine whether the functional split reconfiguration is necessary based on at least one of a state of the AI function and whether another AI function needs to be added, a resource state of the RU, a resource state of the DU, or a current functional split option state, wherein the state of the AI function includes a data collection state, an AI model update state, an AI model deployment state, or an AI model learning state.

14. The RU of a base station of claim 12, wherein the controller is further configured to:

determine that the functional split reconfiguration is necessary in any one of a case where a state of the AI function is a data collection state, a case where the state of the AI function is an AI model update state, a case where the state of the AI function is an AI model deployment state, a case where the state of the AI function is an AI model learning state, and a case of adding another AI function, and wherein, in case that it is determined that the functional split reconfiguration is necessary, the controller is further configured to:

reconfigure at least one downlink (DL) physical layer (PHY) function, including an encoding/scrambling function configured to be performed on the RU, to be performed on the DU, and reconfigure at least one uplink (UL) PHY function, including a decoding/descrambling function configured to be performed on the RU, to be performed on the DU.

15. The RU of a base station of claim 11, wherein the controller is further configured to:

determine whether an antenna port mapping block of the RU or channel prediction block of the RU is moved to the DU by the functional split option reconfiguration, based on the split option reconfiguration information, transmit, to the DU, channel information to be moved in case that the antenna port mapping block of the RU or the channel prediction block of the RU is moved to the DU, and reconfigure the functional split option so that the AI function of the RU is moved to the DU, wherein, in case that location information of the AI function is changed by the functional split option reconfiguration, the controller is further configured to:

transmit, to a data collection entity, an AI function location reconfiguration message, receive an unsubscribe message from the data collection entity, and receive an AI function location reconfiguration complete message from the DU, wherein the AI function location reconfiguration complete message is received by the DU from the data collection entity.

16. A digital unit (DU) of a base station in a wireless communication system, comprising:

a transceiver configured to transmit and receive a signal; and a controller configured to:

prepare for a functional split reconfiguration, receive, via the transceiver, a functional split reconfiguration message from an artificial intelligence management function (AIMF), transmit, via the transceiver, the functional split reconfiguration message to a radio unit (RU) of the base station, and reconfigure a functional split option so that an artificial intelligence (AI) function of the RU is moved to the DU based on split option reconfiguration information included in the functional split reconfiguration message.

17. The DU of a base station of claim 16, wherein the controller is further configured to:

determine whether the functional split reconfiguration is necessary, and complete transmission of traffic already being transmitted by the RU and traffic already being transmitted by the DU in case that it is determined that the functional split reconfiguration is necessary.

18. The DU of a base station of claim 17, wherein the controller is further configured to:

determine whether the functional split reconfiguration is necessary based on at least one of a state of the AI function and whether another AI function needs to be added, a resource state of the RU, a resource state of the DU, or a current functional split option state, wherein the state of the AI function includes a data collection state, an AI model update state, an AI model deployment state, or an AI model learning state.

19. The DU of a base station of claim 17, wherein the controller is further configured to:

determine that the functional split reconfiguration is necessary in any one of a case where a state of the AI function is a data collection state, a case where the state of the AI function is an AI model update state, a case where the state of the AI function is an AI model deployment state, a case where the state of the AI function is an AI model learning state, and a case of adding another AI function, and wherein, in case that it is determined that the functional split reconfiguration is necessary, the controller is further configured to:

reconfigure at least one downlink (DL) physical layer (PHY) function, including an encoding/scrambling function configured to be performed on the RU, to be performed on the DU, and reconfigure at least one uplink (UL) PHY function, including a decoding/descrambling function configured to be performed on the RU, to be performed on the DU.

20. The DU of a base station of claim 16, wherein the controller is further configured to:

determine whether an antenna port mapping block of the RU or a channel prediction block of the RU is moved to the DU by the functional split option reconfiguration, based on the split option reconfiguration information, receive, from the RU, channel information to be moved in case that the antenna port mapping block of the RU or the channel prediction block of the RU is moved to the DU, and reconfigure the functional split option so that the AI function of the RU is moved to the DU, and wherein, in case that location information of the AI function is changed by the functional split option reconfiguration, the controller is further configured to transmit an AI function location information update message to the AIMF.

* * * * *